United States Patent
Sada et al.

(10) Patent No.: US 7,206,081 B2
(45) Date of Patent: Apr. 17, 2007

(54) METHOD OF SETTING OUTPUT CONDITIONS OF OUTPUT APPARATUS, OUTPUT SYSTEM, AND PRINTING APPARATUS

(75) Inventors: Hirokazu Sada, Tochigi (JP); Kenichi Suzuki, Kanagawa (JP); Keiji Okoda, Kanagawa (JP); Kazumasa Matsumoto, Kanagawa (JP); Satoshi Shimizu, Kanagawa (JP); Hidehiko Saito, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1123 days.

(21) Appl. No.: 09/897,946

(22) Filed: Jul. 5, 2001

(65) Prior Publication Data

US 2002/0085225 A1 Jul. 4, 2002

(30) Foreign Application Priority Data

Jul. 7, 2000 (JP) ............................. 2000-207086

(51) Int. Cl.
*G06F 15/00* (2006.01)

(52) U.S. Cl. ..................................... 358/1.13; 358/1.15
(58) Field of Classification Search ................. 358/1.1, 358/1.5, 1.9, 1.12, 1.13, 1.14, 1.15, 296, 358/504, 527
See application file for complete search history.

(56) References Cited

U.S. PATENT DOCUMENTS

| 4,313,124 A | 1/1982 | Hara | 346/140 R |
|---|---|---|---|
| 4,345,262 A | 8/1982 | Shirato et al. | 346/140 R |
| 4,459,600 A | 7/1984 | Sato et al. | 346/140 R |
| 4,463,359 A | 7/1984 | Ayata et al. | 346/1.1 |
| 4,558,333 A | 12/1985 | Sugitani et al. | 346/140 R |
| 4,723,129 A | 2/1988 | Endo et al. | 346/1.1 |
| 4,740,796 A | 4/1988 | Endo et al. | 346/1.1 |
| 6,164,747 A | 12/2000 | Yashima et al. | 347/15 |
| 6,278,528 B1 * | 8/2001 | Ohtsuka et al. | 358/1.15 |
| 6,384,923 B1 * | 5/2002 | Lahey | 358/1.13 |
| 6,687,020 B1 * | 2/2004 | Hanagami et al. | 358/1.2 |
| 6,831,755 B1 * | 12/2004 | Narushima et al. | 358/1.9 |

FOREIGN PATENT DOCUMENTS

| JP | 59-123670 | 7/1984 |
|---|---|---|
| JP | 59-138461 | 8/1984 |
| JP | 4-187142 | 7/1992 |
| JP | 10-143627 | 5/1998 |
| JP | 10-324002 | 12/1998 |
| JP | 2000-013718 A | 1/2000 |
| JP | 2000-156774 A | 6/2000 |

* cited by examiner

*Primary Examiner*—Mark Wallerson
(74) *Attorney, Agent, or Firm*—Fitzpatrick, Cella, Harper & Scinto

(57) ABSTRACT

When data to be output in accordance with a predetermined protocol and attached information of the data are input in setting output conditions of an output apparatus capable of setting a plurality of output parameters, information concerning output of the data is detected from the attached information. An output parameter is selected in accordance with the detected information, and the data is converted in accordance with the selected output parameter. This reduces operations by a user, so an appropriate output corresponding to the data can be obtained without any expert knowledge. This invention is applicable to, e.g., an output system for printing medical images.

20 Claims, 21 Drawing Sheets

FIG. 15

| CV | CD | CV | CD |
|---|---|---|---|
| 0 | 0 | ... | ... |
| 1 | 1 | ... | ... |
| 2 | 2 | 232 | 229 |
| 3 | 3 | 233 | 230 |
| 4 | 3 | 234 | 231 |
| 5 | 4 | 235 | 232 |
| 6 | 5 | 236 | 233 |
| 7 | 6 | 237 | 234 |
| 8 | 7 | 238 | 236 |
| 9 | 8 | 239 | 237 |
| 10 | 8 | 240 | 238 |
| 11 | 9 | 241 | 239 |
| 12 | 10 | 242 | 240 |
| 13 | 11 | 243 | 241 |
| 14 | 12 | 244 | 242 |
| 15 | 13 | 245 | 243 |
| 16 | 14 | 246 | 245 |
| 17 | 15 | 247 | 246 |
| 18 | 15 | 248 | 247 |
| 19 | 16 | 249 | 248 |
| 20 | 17 | 250 | 249 |
| 21 | 18 | 251 | 250 |
| 22 | 19 | 252 | 252 |
| 23 | 20 | 253 | 253 |
| 24 | 21 | 254 | 254 |
| 25 | 21 | 255 | 255 |

FIG. 16

| CV | CD | CV | CD |
|---|---|---|---|
| 0 | 0 | . | . |
| 1 | 14 | . | . |
| 2 | 27 | . | . |
| 3 | 41 | 232 | 3673 |
| 4 | 54 | 233 | 3691 |
| 5 | 68 | 234 | 3709 |
| 6 | 82 | 235 | 3727 |
| 7 | 95 | 236 | 3746 |
| 8 | 109 | 237 | 3764 |
| 9 | 123 | 238 | 3782 |
| 10 | 136 | 239 | 3800 |
| 11 | 150 | 240 | 3819 |
| 12 | 164 | 241 | 3837 |
| 13 | 178 | 242 | 3855 |
| 14 | 191 | 243 | 3873 |
| 15 | 205 | 244 | 3892 |
| 16 | 219 | 245 | 3910 |
| 17 | 233 | 246 | 3929 |
| 18 | 247 | 247 | 3947 |
| 19 | 261 | 248 | 3965 |
| 20 | 275 | 249 | 3984 |
| 21 | 289 | 250 | 4002 |
| 22 | 303 | 251 | 4021 |
| 23 | 317 | 252 | 4039 |
| 24 | 331 | 253 | 4058 |
| 25 | 345 | 254 | 4076 |
| 26 | 359 | 255 | 4095 |

FIG. 17

| No | #6 | #5 | #4 | #3 | #2 | dl(i) | th(i) |
|---|---|---|---|---|---|---|---|
| 0  | ○ | ○ | ○ | ○ | × | 0.0   |       |
| 1  | ○ | ○ | ○ | × | ○ | 8.6   | 4.3   |
| 2  | ○ | ○ | ○ | × | × | 17.3  | 13.0  |
| 3  | ○ | ○ | × | ○ | ○ | 25.9  | 21.6  |
| 4  | ○ | ○ | × | ○ | × | 34.6  | 30.3  |
| 5  | ○ | ○ | × | × | ○ | 43.2  | 38.9  |
| 6  | ○ | ○ | × | × | × | 51.9  | 47.6  |
| 7  | ○ | × | ○ | ○ | ○ | 60.5  | 56.2  |
| 8  | ○ | × | ○ | ○ | × | 69.2  | 64.9  |
| 9  | ○ | × | ○ | × | ○ | 77.8  | 73.5  |
| 10 | ○ | × | ○ | × | × | 86.4  | 82.1  |
| 11 | ○ | × | × | ○ | ○ | 95.1  | 90.8  |
| 12 | ○ | × | × | ○ | × | 103.7 | 99.4  |
| 13 | ○ | × | × | × | ○ | 112.4 | 108.1 |
| 14 | ○ | × | × | × | × | 121.0 | 116.7 |
| 15 | × | ○ | ○ | ○ | ○ | 125.3 | 123.2 |
| 16 | × | ○ | ○ | ○ | × | 134.0 | 129.7 |
| 17 | × | ○ | ○ | × | ○ | 142.6 | 138.3 |
| 18 | × | ○ | ○ | × | × | 151.3 | 147.0 |
| 19 | × | ○ | × | ○ | ○ | 159.9 | 155.6 |
| 20 | × | ○ | × | ○ | × | 168.6 | 164.3 |
| 21 | × | ○ | × | × | ○ | 177.2 | 172.9 |
| 22 | × | ○ | × | × | × | 185.9 | 181.6 |
| 23 | × | × | ○ | ○ | ○ | 194.5 | 190.2 |
| 24 | × | × | ○ | ○ | × | 203.1 | 198.8 |
| 25 | × | × | ○ | × | ○ | 211.8 | 207.5 |
| 26 | × | × | ○ | × | × | 220.4 | 216.1 |
| 27 | × | × | × | ○ | ○ | 229.1 | 224.8 |
| 28 | × | × | × | ○ | × | 237.7 | 233.4 |
| 29 | × | × | × | × | ○ | 246.4 | 242.1 |
| 30 | × | × | × | × | × | 255.0 | 250.7 |

FIG. 18

| No | #6 | #5 | #4 | #3 | #2 | #1 | dl(i) | th(i) |
|---|---|---|---|---|---|---|---|---|
| 0 | ○ | ○ | ○ | ○ | × | × | 0.0 | |
| 1 | ○ | ○ | ○ | × | ○ | × | 8.6 | 4.3 |
| 2 | ○ | ○ | ○ | × | × | × | 17.3 | 13.1 |
| 3 | ○ | ○ | × | ○ | ○ | × | 25.9 | 21.6 |
| 4 | ○ | ○ | × | ○ | × | × | 34.6 | 30.4 |
| 5 | ○ | ○ | × | × | ○ | × | 43.2 | 38.9 |
| 6 | ○ | ○ | × | × | × | × | 51.9 | 47.6 |
| 7 | ○ | × | ○ | ○ | ○ | × | 60.5 | 56.2 |
| 8 | ○ | × | ○ | ○ | × | ○ | 64.8 | 62.7 |
| 9 | ○ | × | ○ | ○ | × | × | 69.2 | 67.0 |
| 10 | ○ | × | ○ | ○ | ○ | ○ | 73.5 | 71.3 |
| 11 | ○ | × | ○ | × | ○ | × | 77.8 | 75.6 |
| 12 | ○ | × | ○ | × | × | ○ | 82.1 | 80.0 |
| 13 | ○ | × | ○ | × | × | ○ | 86.4 | 84.3 |
| 14 | ○ | × | ○ | ○ | ○ | ○ | 90.8 | 88.6 |
| 15 | ○ | × | × | ○ | ○ | × | 95.1 | 92.9 |
| 16 | ○ | × | × | ○ | × | ○ | 99.4 | 97.2 |
| 17 | ○ | × | × | ○ | × | × | 103.7 | 101.6 |
| 18 | ○ | × | × | × | ○ | ○ | 108.1 | 105.9 |
| 19 | ○ | × | × | × | ○ | × | 112.4 | 110.2 |
| 20 | ○ | × | × | × | × | ○ | 116.7 | 114.5 |
| 21 | ○ | × | × | × | × | × | 121.0 | 118.9 |
| 22 | × | ○ | ○ | ○ | ○ | × | 125.3 | 123.2 |
| 23 | × | ○ | ○ | ○ | × | ○ | 129.7 | 127.5 |
| 24 | × | ○ | ○ | ○ | × | × | 134.0 | 131.8 |
| 25 | × | ○ | ○ | ○ | ○ | ○ | 138.3 | 136.1 |
| 26 | × | ○ | ○ | ○ | ○ | × | 142.6 | 140.5 |
| 27 | × | ○ | ○ | × | × | ○ | 147.6 | 144.8 |
| 28 | × | ○ | ○ | × | × | × | 151.3 | 149.1 |
| 29 | × | ○ | × | ○ | ○ | ○ | 155.6 | 153.4 |
| 30 | × | ○ | × | ○ | ○ | × | 159.9 | 157.8 |
| 31 | × | ○ | × | ○ | × | ○ | 164.2 | 162.1 |
| 32 | × | ○ | × | ○ | × | × | 168.6 | 166.4 |
| 33 | × | ○ | × | × | ○ | ○ | 172.9 | 170.7 |
| 34 | × | ○ | × | × | ○ | × | 177.2 | 175.0 |
| 35 | × | ○ | × | × | × | ○ | 181.5 | 179.4 |
| 36 | × | ○ | × | × | × | × | 185.9 | 183.7 |
| 37 | × | × | ○ | ○ | ○ | ○ | 190.2 | 188.0 |
| 38 | × | × | ○ | ○ | ○ | × | 194.5 | 192.3 |
| 39 | × | × | ○ | ○ | × | ○ | 198.8 | 196.7 |
| 40 | × | × | ○ | ○ | × | ○ | 203.1 | 201.0 |
| 41 | × | × | ○ | × | ○ | ○ | 207.5 | 205.3 |
| 42 | × | × | ○ | × | ○ | × | 211.8 | 209.6 |
| 43 | × | × | ○ | × | × | ○ | 216.1 | 213.9 |
| 44 | × | × | ○ | × | × | × | 220.4 | 218.3 |
| 45 | × | × | × | ○ | ○ | ○ | 224.8 | 222.6 |
| 46 | × | × | × | ○ | ○ | × | 229.1 | 226.9 |
| 47 | × | × | × | ○ | × | ○ | 233.4 | 231.2 |
| 48 | × | × | × | ○ | × | × | 237.7 | 235.6 |
| 49 | × | × | × | × | ○ | ○ | 242.0 | 239.9 |
| 50 | × | × | × | × | ○ | × | 246.4 | 244.2 |
| 51 | × | × | × | × | × | ○ | 250.7 | 248.5 |
| 52 | × | × | × | × | × | × | 255.0 | 252.8 |
| ※ | ○ | ○ | ○ | × | × | ○ | 13.0 | 10.8 |
| ※ | ○ | ○ | × | ○ | × | ○ | 30.3 | 28.1 |
| ※ | ○ | ○ | × | × | ○ | ○ | 38.9 | 36.7 |
| ※ | ○ | ○ | × | × | × | ○ | 47.5 | 45.4 |

| — | — | * | 7 | 3 |
|---|---|---|---|---|
| 1 | 3 | 7 | 3 | 1 |
| 0 | 1 | 3 | 1 | 0 |
| 0 | 0 | 1 | 0 | 0 |

TOTAL:31

METHOD OF SETTING OUTPUT CONDITIONS OF OUTPUT APPARATUS, OUTPUT SYSTEM, AND PRINTING APPARATUS

FIELD OF THE INVENTION

The present invention relates to a method of setting output conditions of an output apparatus, an output system, and a printing apparatus and, more particularly, to a method of setting output conditions of an output apparatus which can set a plurality of output parameters and which receives data to be output in accordance with a predetermined protocol together with attached information of the data, an output system, and a printing apparatus.

BACKGROUND OF THE INVENTION

Recently, data is converted into numerical values, processed by computers, and displayed on display units or printed as images by printers in a variety of fields. Therefore, to allow a display unit or printer as an output apparatus to correctly detect transmitted data, a communication scheme (protocol) or format must be set.

This will be described below by taking an output system using DICOM (Digital Imaging and Communications in Medicine) which is a medical image communication protocol as an example.

<System Configuration>

FIG. 5 shows an example of the configuration of an output system using DICOM as a communication protocol.

A host computer 401 and an output apparatus 402 are connected by a communicating means 403. Output parameters and output data are transferred from the host 401 to the output apparatus 402.

As the communicating means 403, a computer network such as Ethernet, serial communication such as RS-232 or USB, or parallel communication such as SCSI or GPIB is used.

The arrangement of the host 401 will be described first.

A CPU 411 performs various internal processes of the host 401 and thereby controls the entire host.

A storage unit 412 stores data to be output. As this storage unit 412, a memory such as an SRAM or DRAM, a fixed storage such as a hard disk, or a removable storage such as a floppy disk or MO is used.

An output parameter lookup table 413 stores output parameters used when the output apparatus 402 outputs data. As this output parameter lookup table 413, a memory such as a ROM or RAM, a fixed storage such as a hard disk, or a removable storage such as a floppy disk or MO is used.

A data processor 414 converts and processes data, stored in the storage unit 402, in accordance with the output parameters. This data processor 414 may be implemented by hardware such as an ASIC. Alternatively, the data processor 414 may be implemented by software, and the CPU performs actual processing.

An I/F unit 415 connects the host 401 and the communicating means 403. This I/F unit 415 can be implemented by either hardware or software in accordance with the type of the communicating means 403.

The arrangement of the output apparatus 402 will be described next.

This output apparatus 402 actually displays or prints out data in accordance with the output parameters transferred from the host 401.

An I/F unit 421 connects the output apparatus 402 and the communicating means 403. Like the I/F unit 415, this I/F unit 421 may be implemented by either hardware or software.

An output parameter storage 422 stores the output parameters defined and transferred by the host 401 and is looked up when an output unit 425 outputs data. As this output parameter storage 422, a memory such as an SRAM or DRAM or a fixed storage such as a hard disk is used.

A buffer storage 423 buffers data processed and transferred by the host 401, before the output unit 425 outputs data. As this buffer storage 423, a memory such as an SRAM or DRAM or a fixed storage such as a hard disk is used.

The output unit 425 actually outputs data transferred from the host 401. Examples of this output unit 425 are a monitor display and a printer.

<Data>

Data processed by the above system contains actual information and attached information.

In the DICOM format, the actual information is image data. Images photographed by, e.g., X-rays, CT, and MR are stored in various formats. Each image data is represented by monochrome data of 8 bits (or less), monochrome data of 16 bits (or less), or color data of 8 bits (or less) for each color, in accordance with a format designated in the attached information.

The attached information relates to the image format of the actual information, conditions (input conditions) when the actual information is formed, and conditions (output conditions) when the actual information is output. The information concerning the image format includes, e.g., the image size, the number of gray levels per pixel, the image mode indicating whether the image is monochrome or color, the maximum density, the pixel construction method (data storage method) when one pixel is constructed by a plurality of data, and the dynamic range of density.

Examples of the input conditions are the input date/time, the manufacturer, type, and serial number of the input modality (apparatus), the input person, the input environment (e.g., temperature and humidity), the input location, the information (e.g., the name, date of birth, and object ID) pertaining to the photographed person, and the photographed portion.

Examples of the output conditions are the output medium, the image processing method (e.g., the extrapolation method and the tone correction method), the output method (the algorithm and superposition of outputs when data is actually output), the output mode (e.g., a high-speed mode or high-resolution mode), the manufacturer, type, and serial number of the output apparatus, the output person, the output location, and the output date/time.

<Parameters>

In the above system, output parameters are output conditions set when the output apparatus 402 outputs data.

Diverse output parameters are used in accordance with the type of output apparatus. For example, when the output apparatus 402 is an inkjet printer, output parameters are the type of ink, the density of ink, the method of combining inks, the ink residual amount/full tank detecting mechanism, the recovery sequence, the image processing algorithm (e.g., the extrapolation method and the tone correction method), the number of times of overlay printing (the number of passes) before output completion, and the type and size of output medium (e.g., paper or film).

<Flow Chart>

Processing until data is output in the conventional output system with the above configuration will be described below with reference to a flow chart in FIG. 7 which shows the processing steps of the output apparatus. This data output is performed by two stages: parameter setting operation and data output operation.

In the parameter setting operation, the host 401 extracts desired parameters from the output parameter lookup table 413. To transfer the extracted parameters to the output apparatus 402 via the communicating means 403, the host 401 transfers the parameters to the I/F unit 415.

These parameters transferred to the output apparatus 402 are input via the I/F unit 421 (step S71) and stored in the output parameter storage 422 (step S72). In this way, the parameter setting operation is completed (step S73).

The data output operation is then executed. In the host 401, data stored in the storage unit 412 is read out, and the readout data is converted and processed in accordance with the previously selected output parameters. The converted and processed data is transferred to the communicating means 403 via the I/F unit 415.

The output apparatus 402 receives the data from the communicating means 403 via the I/F unit 421 (step S74). The received data is converted into a form which can be output by the output unit 425, by referring to the output parameters stored in the output parameter storage 422 (step S75). The data thus converted into the format that can be output is sent to the buffer storage 423 and temporarily stored in it (step S76). If the output unit 425 is capable of output, the output unit 425 extracts the data from the buffer storage 423 and actually outputs the data (step S77).

FIG. 6 shows another arrangement of the output apparatus in the conventional output system. This output apparatus 501 has a parameter lookup table 522 and image processor 514, in addition to the arrangement of the output apparatus 402 shown in FIG. 5.

When this output apparatus 501 is to output data, output parameters are first set. That is, a host computer or the like designates output parameters in the parameter lookup table 522 via a communicating means 502. The designated output parameters are stored in a parameter storage 512. In this manner, the setting process of this output apparatus 501 is completed.

When the setting is completed, output data to be actually output is transferred from the communicating means 502 via an I/F unit 511. The transferred output data is temporarily stored in a storage unit 513. An image processor 514 sequentially reads out the data stored in the storage unit 513, and processes the readout data into a desired data format in accordance with the output parameters stored in the parameter storage 512. An output unit 515 outputs the data processed into the desired format, and the output operation is completed.

If the output unit 515 is incapable of output, the storage unit 513, for example, buffers the data.

The medical output system as described above often uses a printing apparatus (printer) as the output apparatus. Although various types of apparatuses are known as printers, an inkjet printer which prints data by discharging a printing agent onto a printing medium is recently extensively used. This is so because the structure is suited to cost reduction and improvements of the performance are remarkable.

To increase the printing speed or the like of an inkjet printer, a nozzle row in which a plurality of ink discharge orifices (nozzles) for discharging ink of the same type are arrayed is formed for each ink of the same color but different in density, or for each of different colors. Also, a tone can be expressed by changing the discharge amount of ink of the same type by a plurality of stages.

An inkjet printer prints data by moving a printhead having these nozzle rows relative to a printing medium and at the same time discharging ink from the nozzles. As printing methods of an inkjet printer, a so-called serial printing method and a so-called full-line printing method are put to practical use. In the former method, nozzle rows are arranged substantially parallel to the convey direction of a printing medium. A printing medium is intermittently conveyed, and, while this printing medium is stopped, data is printed by driving the nozzles and at the same time moving the printhead in a direction substantially perpendicular to the array direction of the nozzle rows. In the latter method, nozzle rows are so fixed as to cover the printing width of a printing medium. Data is printed by driving the nozzles while a printing medium is moved at a constant velocity in a direction perpendicular to the nozzle rows.

When images are printed by these methods, a pixel is defined as a unit for forming an image. This pixel need not be made up of one dot formed on a medium by one-time ink discharge from one nozzle; a pixel may also be made up of a plurality of dots. When a pixel is made up of a plurality of dots, these dots may be printed as they overlay in substantially the same point, or may be printed in adjacent points. In either case, dot positions are determined in accordance with predetermined rules.

An image processing means performs processing such as enlarging interpolation or reduction for image data to be printed, such that the data has an image size suited to a printing apparatus. Subsequently, the color and density to be printed are determined for each pixel in accordance with predetermined rules. The data is printed on the basis of this determination.

In this data printing, one pixel may be made up of a plurality of dots as described above. Hence, a plurality of types of inks differing in density can be chosen as inks used to print each pixel. When a variable-discharge-amount head is used, the discharge amount, i.e., the ink amount used to print a dot can be changed. These two methods may also be combined.

Furthermore, as a method of faithfully reproducing the tone of an image when the image is printed, a halftone processing method such as a dither method or an error diffusion method is used. In this dither method or error diffusion method, the number of gray levels to be expressed can be increased by increasing the number of gray levels of one pixel. A practical example of this printing method is described in, e.g., Japanese Patent Laid-Open No. 10-324002 (U.S. Pat. No. 6,164,747).

In this method, a plurality of types of inks can be discharged for one color, and each pixel is expressed by selectively discharging (overlaying) ink droplets a plurality of times within a predetermined limit. For example, the number of gray levels of the printing density of, e.g., an OD value (transmission density) can be increased. More specifically, when a printhead capable of discharging inks of six different densities is used to overlay dots four times or less for each pixel at 600 dpi, 50 or more gray levels can be expressed under the restriction that no ink dots of the same density are overlaid. Also, 200 or more gray levels can be expressed when each pixel is made up of 2×2 adjacent points and ink dots are overlaid 16 times or less. In either case, the number of gray levels that can be expressed can be increased by overlaying ink dots of the same density.

It may of course also be possible to express a tone by varying the ink amount of dot by varying the amount of ink discharged from a nozzle, instead of discharging inks of different densities as described above. A tone may also be expressed by combining these methods.

In these methods, a rule indicating the correspondence between the density (desired OD value) of a pixel to be expressed and the ink overlaying method is predetermined. In accordance with this rule, actual printing, i.e., the nozzle and the timing of ink discharge are determined. A printing control means performs actual printing in accordance with the determination.

As an example, printing OD values as pixel densities when printing is actually performed by different inks are measured, and a printing OD value when overlay printing is performed is calculated from the measurement values. A table describing the printing OD values of pixels in one-to-one correspondence with the overlay printing combination is prepared. An overlay printing combination by which a printing OD value close to the desired OD value of a pixel to be printed is obtained is chosen. In the error diffusion process, a difference between the desired OD value of a pixel to be printed and the printing OD value in the table is calculated, and this difference is distributed as an error to adjacent pixels.

The conventional output system is constructed as above. When the output apparatus is to output data, therefore, the host first transmits data concerning parameters for setting the output apparatus and then actually transmits output data. Hence, data transfer is performed a plurality of times, and this requires user's labor and a long time before data is actually output.

Also, since the setting of the output apparatus and the transfer of output data are separately performed, the two processes cannot be matched in some cases. For example, parameters not matching the characteristics of output data may be transmitted to the output apparatus, or output data alone may be transmitted without setting parameters. As a consequence, the output data is output under output conditions which are not optimum Furthermore, when high-quality output is required, a large number of various parameters must be set. Since this complicates the setting of the output apparatus, expert knowledge is necessary.

This situation will be considered by taking a case in which a printing apparatus is used as an output apparatus in a medical output system as an example. Many types of modalities such as DR (an X-ray photographing apparatus), CT, MR, and US are used to generate medical images.

DR acquires digital image data in conventionally performed X-ray photographing and has various types. Examples are a modality by which an output image from I.I. (Imaging Intensifier) is converted into a digital signal, a modality by which an imaging plate on which a latent image is formed by X-ray photographing is scanned with a laser beam and converted into a digital signal, and a modality by which an image obtained by X-ray photographing is converted into a digital signal by a sensor. CT and MR obtain digital data of a tomographic image of a human body by using X-rays and magnetism, respectively. US obtains a signal of a tomographic image of a human body by using ultrasonic waves.

When hard copies are to be obtained from image data generated by these modalities by using a printer as the output apparatus, the necessary specifications largely change from one modality to another. Many images generated by DR have relatively gradually changing tones. Also, since objects to be diagnosed by DR are light shades, the acquired image data often has 1,000 or more gray levels, so the number of gray levels of hard copies must also be 1,000 or more. On the other hand, the number of gray levels obtained by CT, MR, and US is about 256 to 512, and many images obtained by these modalities have relatively abruptly changing tones. Accordingly, the number of gray levels of hard copies need only be about 256 to 512.

A printer which forms hard copies from these image data generally takes a long processing time if the number of gray levels to be expressed is large, regardless of the printing method.

In the conventional medical output system, a dedicated printer is connected to each of such modalities. Therefore, an optimum printer is selected and connected to each modality, or printing parameters of a printer are set in advance so as to be optimum for a connected modality.

With the recent advance of networks, however, a plurality of modalities are often connected to the same network to share a single printer connected to that network. Even in a case like this, it is desirable to print data by setting optimum parameters for each modality.

For example, to print a DR image requiring a large number of gray levels, the number of gray levels of a hard copy must be increased; to print a CT, MR, or US image requiring a relatively small number of gray levels, decreasing the number of gray levels is effective to shorten the overall processing time.

To meet this demand, it is possible to prepare a plurality of tone processing methods and form a hard copy by using an optimum tone processing method in accordance with the modality used. It is also favorable to be able to form a hard copy by necessary and sufficient tone processing in accordance with the department which has requested examination, the purpose of examination, and the purpose of use of a hard copy. Furthermore, it is favorable to be able to select a necessary and sufficient one of not only tone processing methods but also types of printing media to be used.

Unfortunately, if tone processing and a printing medium can be changed in accordance with the type of modality or the purpose of use as described above, a user must perform various settings of a printing apparatus by using a keyboard or the like before the printing apparatus can output data. After these settings, the user instructs the printing apparatus to actually print the data.

In this case, therefore, a number of diverse settings must be performed. Since this complicates the settings of the printing apparatus, expert knowledge is required.

SUMMARY OF THE INVENTION

It is an object of the present invention to provide a method of setting output conditions of an output apparatus, by which operations by a user are reduced and an appropriate output corresponding to data can be obtained without any specific expert knowledge.

It is another object of the present invention to provide an output system by which operations by a user are reduced and an appropriate output corresponding to data can be obtained without any specific expert knowledge.

It is still another object of the present invention to provide a printing apparatus by which operations by a user are reduced and an appropriate output corresponding to data can be obtained without any specific expert knowledge.

The first object described above is achieved by a method of setting output conditions of an output apparatus capable of setting a plurality of output parameters, comprising the detection step of, when data to be output in accordance with a predetermined protocol and attached information of the data are input, detecting information pertaining to output of the data from the attached information, the selection step of selecting an output parameter in accordance with the detected information, and the conversion step of converting the data in accordance with the selected output parameter.

That is, when data to be output in accordance with a predetermined protocol and attached information of the data are input to an output apparatus capable of setting a plurality of output parameters, information concerning output of data is detected from the attached information. An output parameter is selected in accordance with the detected information, and the data is converted in accordance with the selected output parameter.

In this method as described above, when data is transferred to the output apparatus as an output process, information concerning output is detected from attached information transmitted together with the data, and an output parameter required by the output apparatus is automatically selected. The data is output in accordance with this output parameter.

Accordingly, a user need only perform the output process without performing any parameter setting process for the output apparatus. This reduces operations by the user until data is finally output, so an appropriate output corresponding to the data can be obtained without any expert knowledge.

The detection step, selection step, and conversion step can be executed in the output apparatus or in the host apparatus which transmits data and attached information to the output apparatus.

In practice, the predetermined protocol is a medical image communication protocol, and the output apparatus is a printing apparatus for printing data on a printing medium. More specifically, the output apparatus is an inkjet printing apparatus for printing data on a printing medium by discharging ink droplets.

The information pertaining to output of data preferably includes an image acquisition modality or the type of printing medium. The output parameter preferably includes a gamma characteristic or the number of printing gray levels.

The second object described above is achieved by an output system including a host apparatus for outputting data to be output in accordance with a predetermined protocol and attached information of the data, and an output apparatus capable of setting a plurality of output parameters, comprising detecting means for detecting information pertaining to output of the data from the attached information, selecting means for selecting an output parameter in accordance with the detected information, and converting means for converting the data in accordance with the selected output parameter.

The third object described above is achieved by a printing apparatus capable of setting a plurality of printing parameters, comprising detecting means for, when data to be output in accordance with a predetermined protocol and attached information of the data are input, detecting information pertaining to output of the data from the attached information, selecting means for selecting a printing parameter in accordance with the detected information, and converting means for converting the data in accordance with the selected printing parameter.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 15 is a view showing an example of a gamma correction table a;

FIG. 16 is a view showing an example of a gamma correction table b;

FIG. 17 is a view showing an example of an ink combination table a;

FIG. 18 is a view showing an example of an ink combination table b;

DETAILED DESCRIPTION OF THE PREFERRED EMBODIMENTS

Preferred embodiments of the present invention will now be described in detail in accordance with the accompanying drawings. The present invention will be explained by taking an output system using DICOM as a medical image communication protocol as an example.

[First Embodiment]

Figure 1:
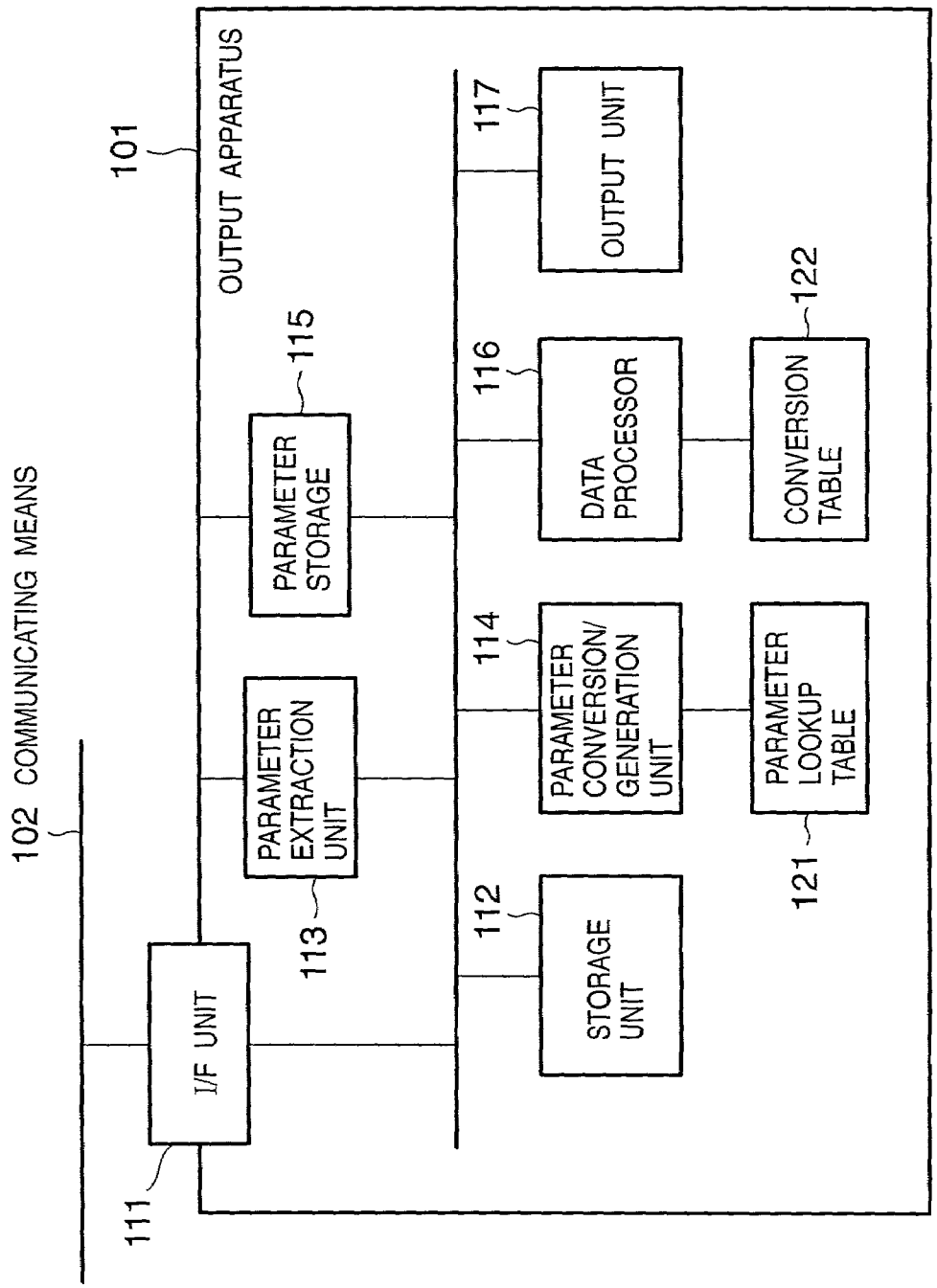
FIG. 1 is a block diagram showing the arrangement of the first embodiment of the present invention.

An output system of the first embodiment comprises a host and output apparatus, and the arrangement of the output apparatus differs from that of the conventional system. Only this output apparatus will be described in detail below. FIG. 1 is a block diagram showing the arrangement of the output apparatus of the first embodiment of the output system according to the present invention.

An output apparatus 101 implementing the system of this embodiment is connected to a host (not shown) via a communicating means 102. Examples of this communicating means are computer networks such as Ethernet, parallel I/Fs such as SCSI and GPIB, and serial I/Fs such as RS-232 and USB.

An I/F unit 111 exchanges data between the output apparatus 101 and the communicating means 102. This I/F unit 111 can be implemented by either hardware or software in accordance with the type of the communicating means 102.

A storage unit 112 stores output data and parameters transferred to the output apparatus 101. As this storage unit 112, a memory such as an SRAM or DRAM, a fixed storage such as a hard disk, or a removable storage such as a floppy disk or MO is used.

A parameter extraction unit 113 extracts information which can be a parameter necessary for the output apparatus 101 to output data, from attached information contained in output data. This parameter extraction unit 113 can be implemented by either hardware or software.

A parameter conversion·formation unit 114 converts the attached information extracted by the parameter extraction unit 113 into output parameters, or forms output parameters from the attached information, by looking up a parameter lookup table 121. This parameter conversion·formation unit 114 may be implemented by either hardware such as ASIC or software.

The parameter lookup table 121 stores conversion data for converting the extracted attached information into output parameters. This parameter lookup table 121 can further have a conversion table indicating the correspondence between extracted attached information and output parameters, and a function of forming output parameters from a plurality of pieces of attached information.

A parameter storage 115 stores output parameters formed by the parameter conversion·formation unit 114. As this parameter storage 115, a memory such as an SRAM or DRAM, a fixed storage such as a hard disk, or a removable storage such as a floppy disk or MO is used.

A data processor 116 converts actual data stored in the storage unit 112 in accordance with the output parameters stored in the parameter storage 115, such that the data can be output by an output unit. This data processing is performed by looking up a conversion table 122. The data processor 116 may be implemented by hardware such as ASIC. Alternatively, the data processor 116 may be configured by software, and a CPU may perform actual processing.

The conversion table 122 stores parameters necessary to convert actual data into data which the output apparatus can output.

An output unit 117 actually outputs the converted actual data. Examples of the output unit 117 are a monitor display and a printer.

<Flow Chart>

Figure 3:
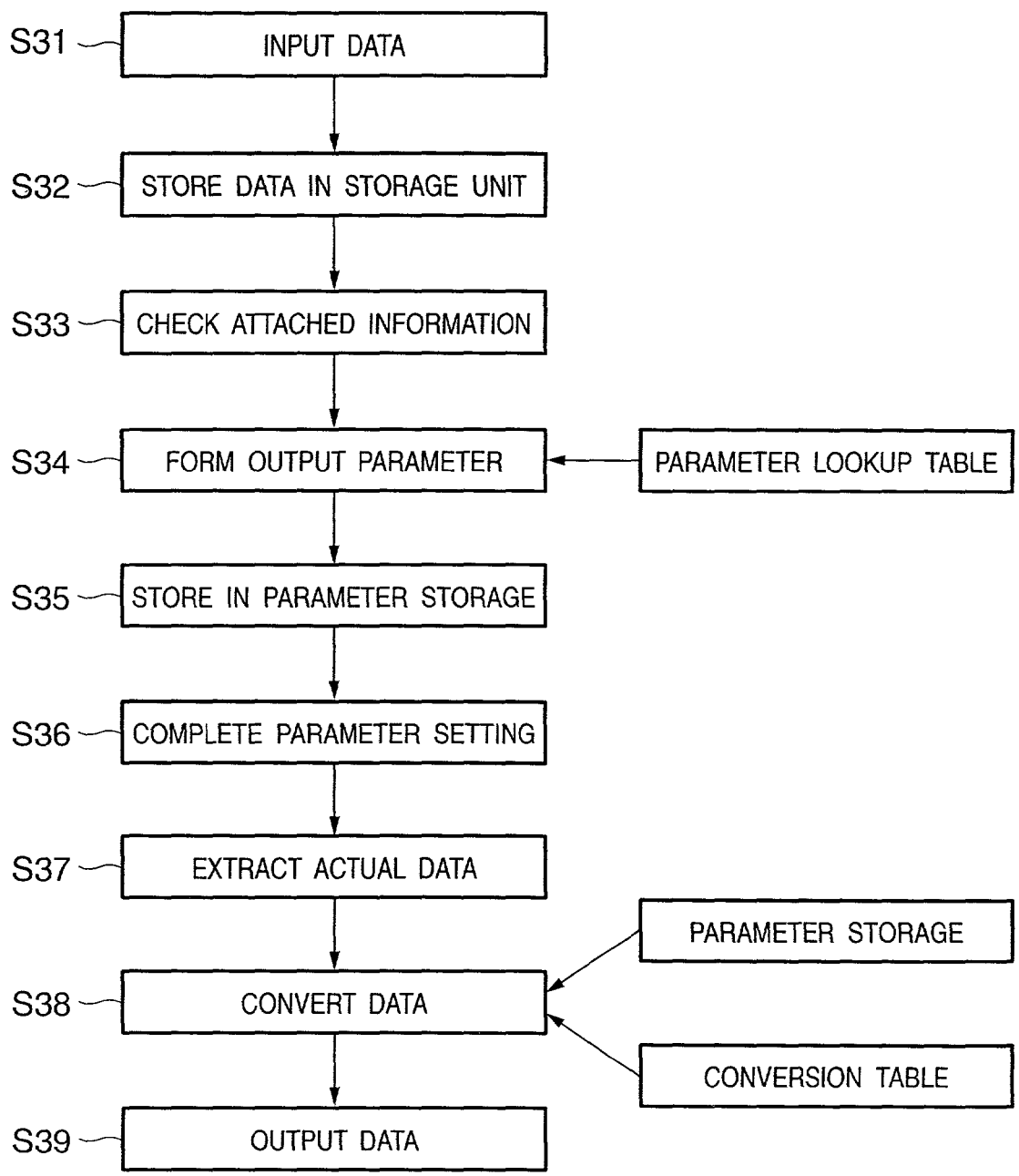
FIG. 3 is a flow chart showing the operation of the first embodiment.

Processing until data is output by the output apparatus with the above arrangement will be described below with reference to a flow chart shown in FIG. 3.

First, output data transmitted from the host is transferred from the communicating means 102 to the output apparatus 101 via the I/F unit 111 (step S31).

This data is temporarily stored in the storage unit 112 (step S32). The parameter extraction unit 113 reads out and checks attached information of the data stored in the storage unit 112, thereby extracting a portion necessary to form an output parameter which the output apparatus 101 requires (step S33).

The parameter conversion·formation unit 114 converts the extracted attached information into output parameters, or forms output parameters from the extracted attached information, by looking up the parameter lookup table 121 (step S34). The output parameters formed by the parameter conversion·formation unit 114 are stored in the parameter storage 115 (step S35). Thus the setting of the output apparatus 101 is completed (step S36).

When the setting of the output apparatus 101 is completed, a process of outputting actual data stored in the storage unit 112 starts.

The data processor 116 loads the actual data stored in the storage unit 112 (step S37), and converts the data in accordance with the output parameters stored in the parameter storage 115 (step S38). That is, the data processor 116 converts the data by looking up the conversion table 122 corresponding to the output parameters, so that the data can be actually output.

The actual data thus processed is output as output data to the output unit and actually output (step S39).

<Extraction·Formation of Output Parameters>

Details of the process of forming output parameters from attached information performed in steps S33 and S34 of the above flow chart will be described below.

Figure 4:
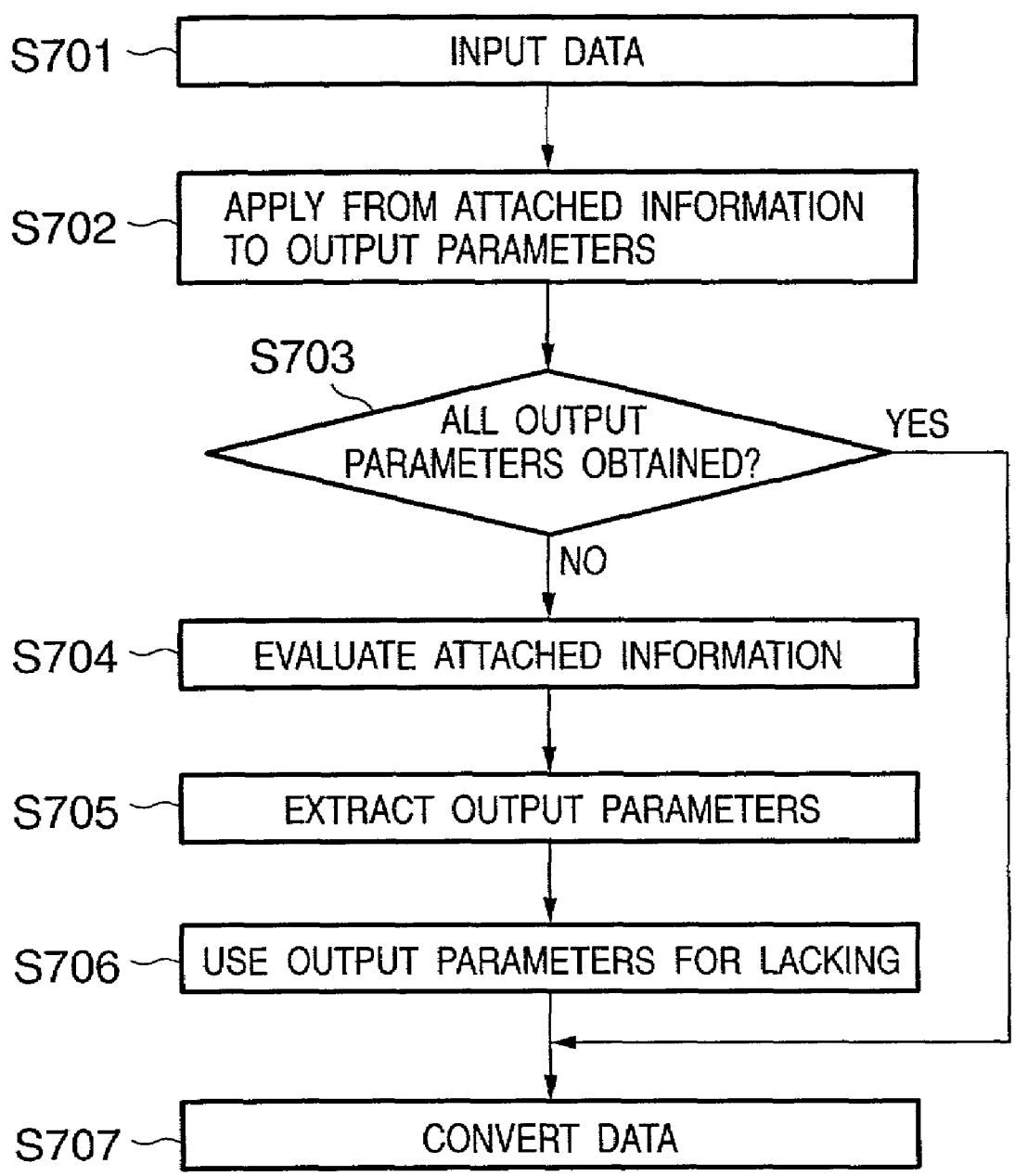
FIG. 4 is a flow chart for determining output parameters according to the present invention.
Figure 5:
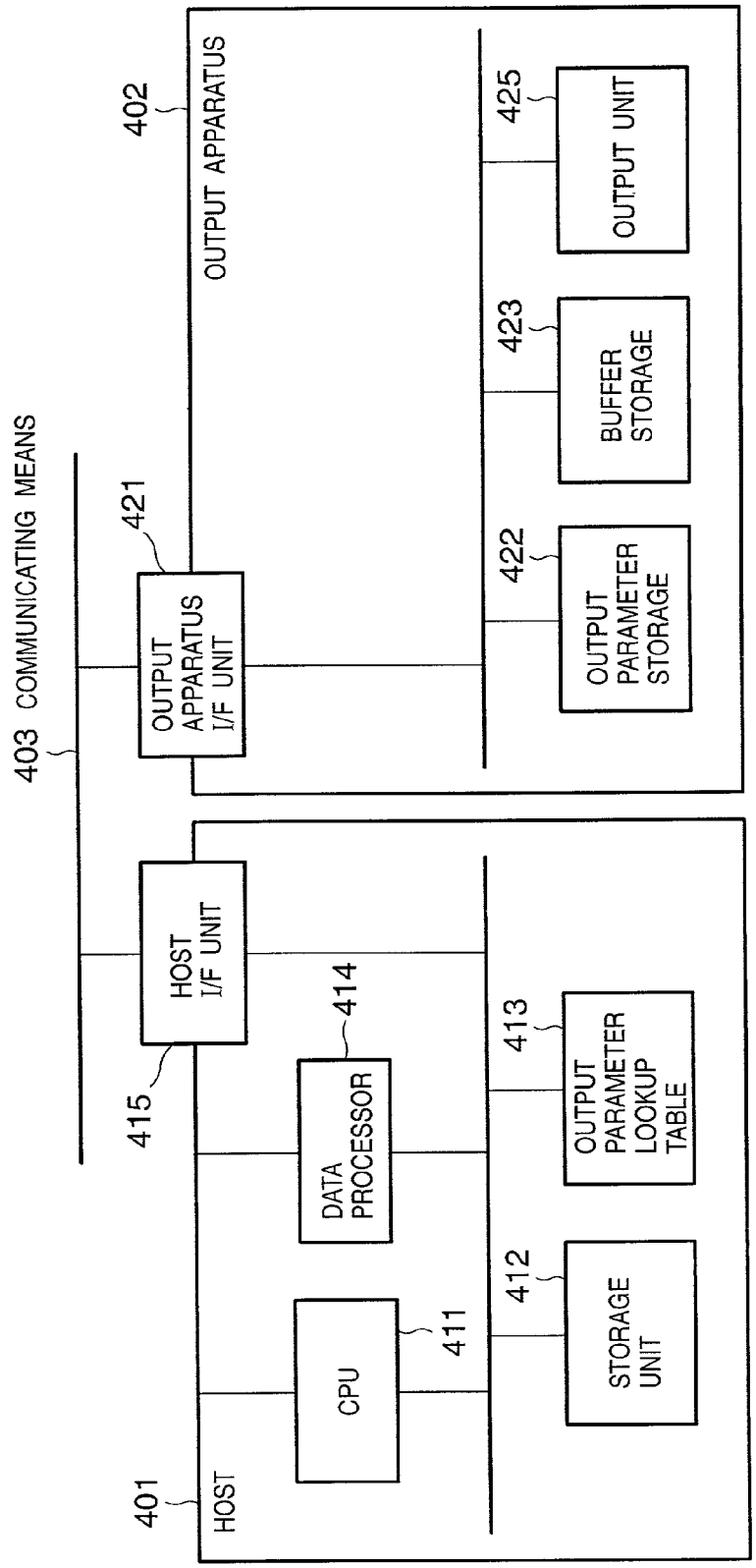
FIG. 5 is a block diagram showing the configuration of a conventional output system.
Figure 6:
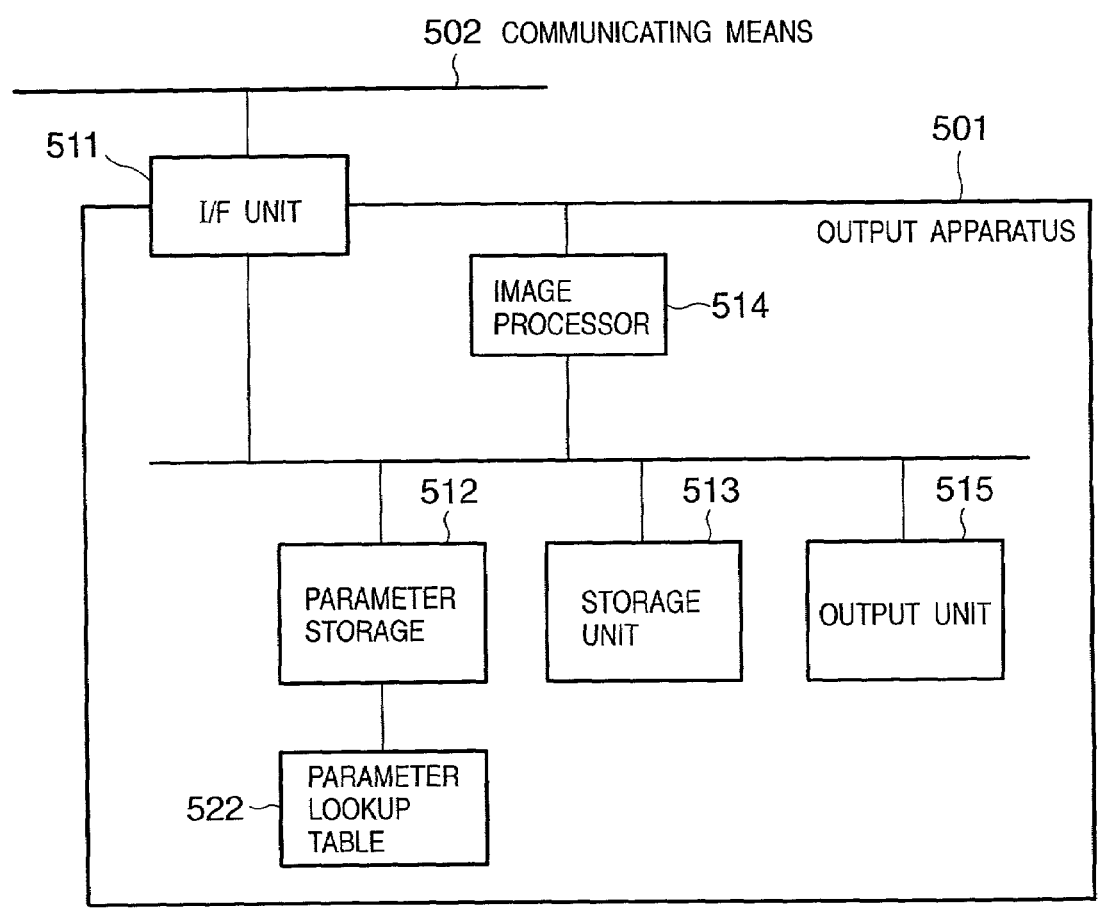
FIG. 6 is a block diagram showing another configuration of the conventional output system.
Figure 7:
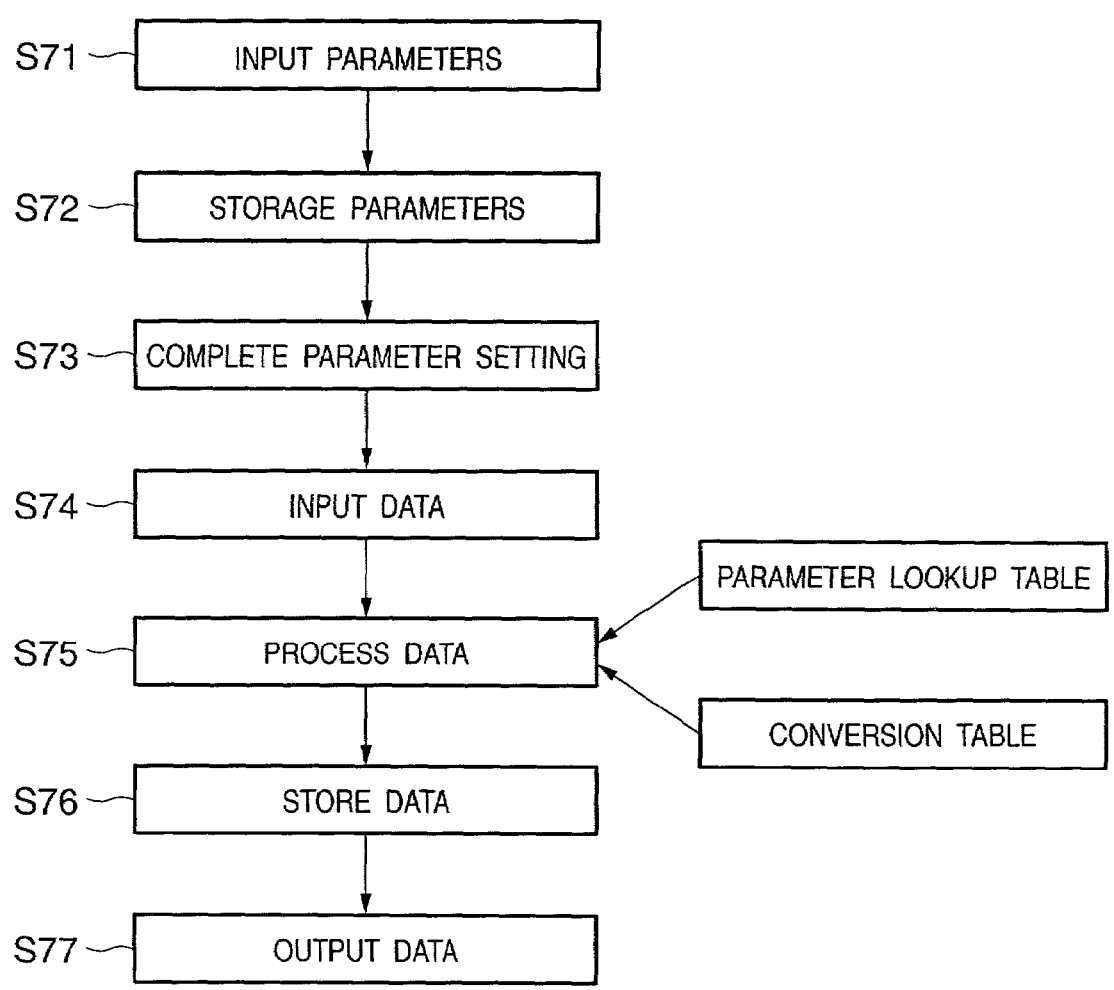
FIG. 7 is a flow chart showing the operation of the conventional output system.

FIG. 4 is a flow chart of the process of forming output parameters from attached information in the output system according to the present invention.

First, in step S701, data input is started. To check attached information, in step S702 output parameters required by the output apparatus are extracted from the attached information and used as output parameters.

After the output parameters contained in the attached information are extracted, the flow advances to step S703 to check whether all output parameters required by the output apparatus are obtained.

If YES in step S703, the flow advances to step S707 in which data conversion is started. If NO in step S703, a procedure of conversion or formation of remaining parameters from the attached information starts.

Conversion or formation of remaining output parameters is performed by the following order. First, in step S704 the attached information is evaluated to extract information useful for conversion or formation of output parameters. In step S705, conversion or formation of output parameters from the extracted information is performed.

In step S706, the output parameters thus converted or formed are used as output parameters lacking in the output system.

The above processing is repeated until it is determined in step S703 that all output parameters necessary for the output apparatus are obtained.

When all output parameters are obtained, the flow advances to data conversion step S707. In step S707, actual data is converted into data which can be output by the output system, on the basis of the extracted output parameters.

In this embodiment as described above, when data is transferred to the output apparatus as an output process, output parameters required by the output apparatus are automatically formed from attached information contained in the data, and the data is output in accordance with the output parameters.

Accordingly, a user need only perform the output process without performing any parameter setting process for the output apparatus. This reduces operations by the user until data is finally output, so an appropriate output corresponding to the data can be obtained without any expert knowledge.

[Second Embodiment]

The second embodiment of the present invention will be described below. Note that a description of parts similar to those of the above first embodiment will be omitted.

Figure 2:
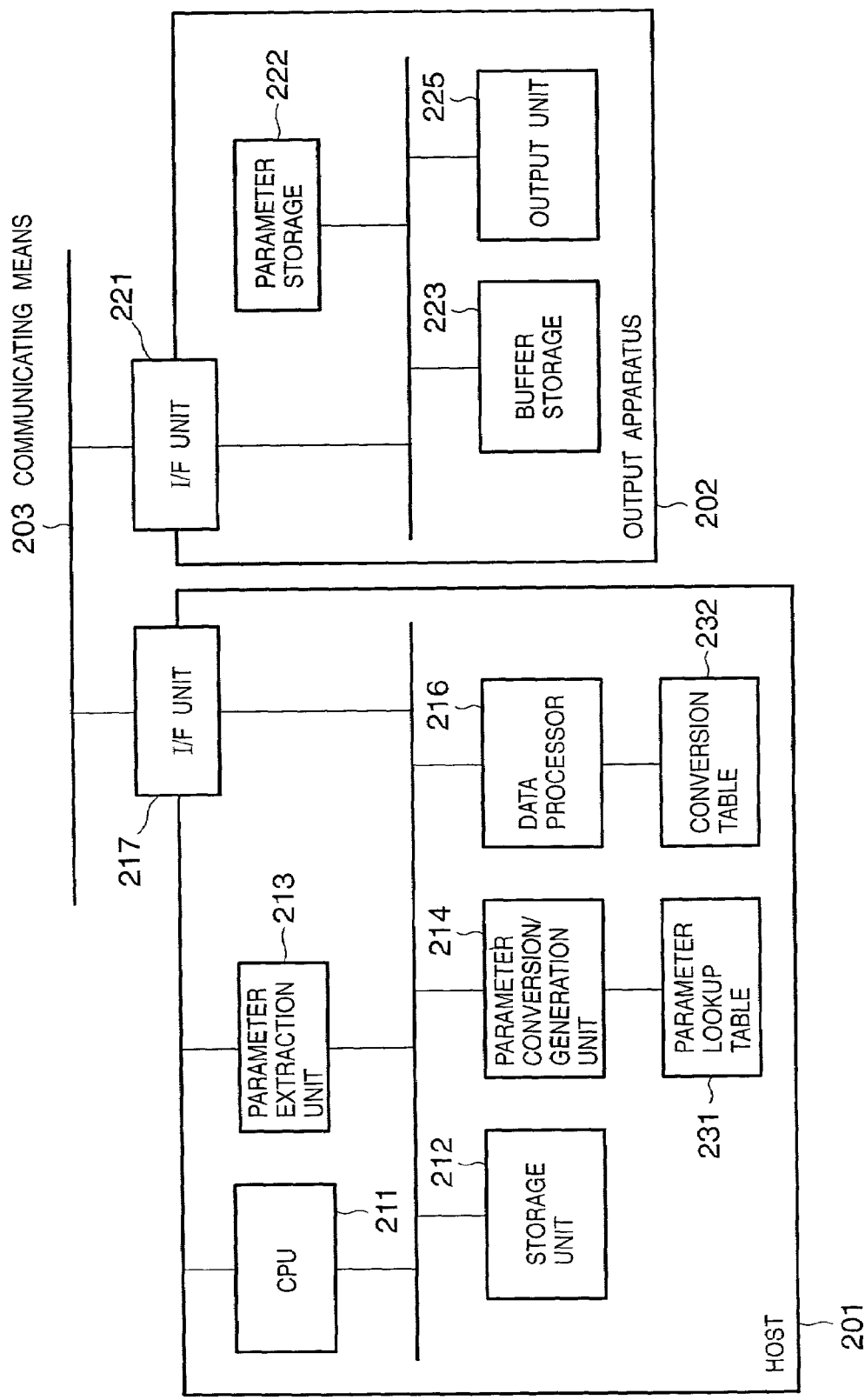
FIG. 2 is a block diagram showing the arrangement of the second embodiment of the present invention.

FIG. 2 is a block diagram showing the configuration of the second embodiment of the output system according to the present invention. The output system of this embodiment also includes a host and an output apparatus connected by a communicating means. However, a parameter extraction unit, parameter conversion·formation unit, parameter lookup table, data processor, and conversion table, which are included in the output apparatus in the first embodiment, are included in the host in this second embodiment.

The arrangement of a host 201 will be described first.

A CPU 211 controls internal processing of the host. A storage unit 212 stores data to be output and is used as a buffer for other processing. A parameter extraction unit 213 retrieves attached information of data stored in the storage unit 212, and extracts information as elements of output parameters.

A parameter conversion·formation unit 214 performs conversion·formation of output parameters from the extracted attached information. A parameter lookup table 213 is looked up when the parameter extraction·formation unit 214 performs conversion·formation of output parameters from elements contained in the attached information extracted by the parameter extraction unit 213.

A data processor 216 processes actual information of the data stored in the storage unit 212, in accordance with the generated output parameters.

A conversion table 232 stores parameters for data processing in the form of a table, when the data processor 216 processes the actual information of the data. An I/F unit 217 connects the host 201 and a communicating means 203 to exchange data between them.

The arrangement of an output apparatus 202 will be described next.

An I/F unit 221 connects the output apparatus 202 and the communicating means 203 to exchange data between them.

A parameter storage 222 stores output parameters for an output unit, which are supplied from the host via the communicating means.

An output unit 225 loads and actually outputs data temporarily stored in a buffer storage.

A buffer storage 223 temporarily buffers data processed by the host 201 and transferred via the communicating means 203, before the data is transferred to the output unit 225.

Processing until data is output in this embodiment with the above configuration is basically the same as in the first embodiment described previously. However, since the communicating means also interposes between the host and the output apparatus, data transfer to the buffer storage and parameter transfer to the output parameter storage are performed from the I/F unit 217 of the host to the I/F unit 221 of the output apparatus via the communicating means 203.

Actual data thus processed is transferred as output data to the output unit and actually output.

In this embodiment as explained above, when transferring data as an output process to the output apparatus, the host automatically forms output parameters required by the connected output apparatus from attached information contained in the data. These output parameters are transmitted together with actual data to the output apparatus. The output apparatus outputs the data in accordance with the output parameters.

Accordingly, a user need only perform the output process without performing any parameter setting process for the output apparatus. This reduces operations by the user until data is finally output, so an appropriate output corresponding to the data can be obtained without any expert knowledge.

[Third Embodiment]

The third embodiment of the present invention will be described below. The third embodiment uses as its output apparatus an inkjet printer capable of expressing 50 or more gray levels at a printing density of 600 dpi and capable of printing by 256 gray levels by performing an error diffusion process. First, the arrangement of this inkjet printer will be described in detail.

<Overall Arrangement of Printer>

Figure 8:
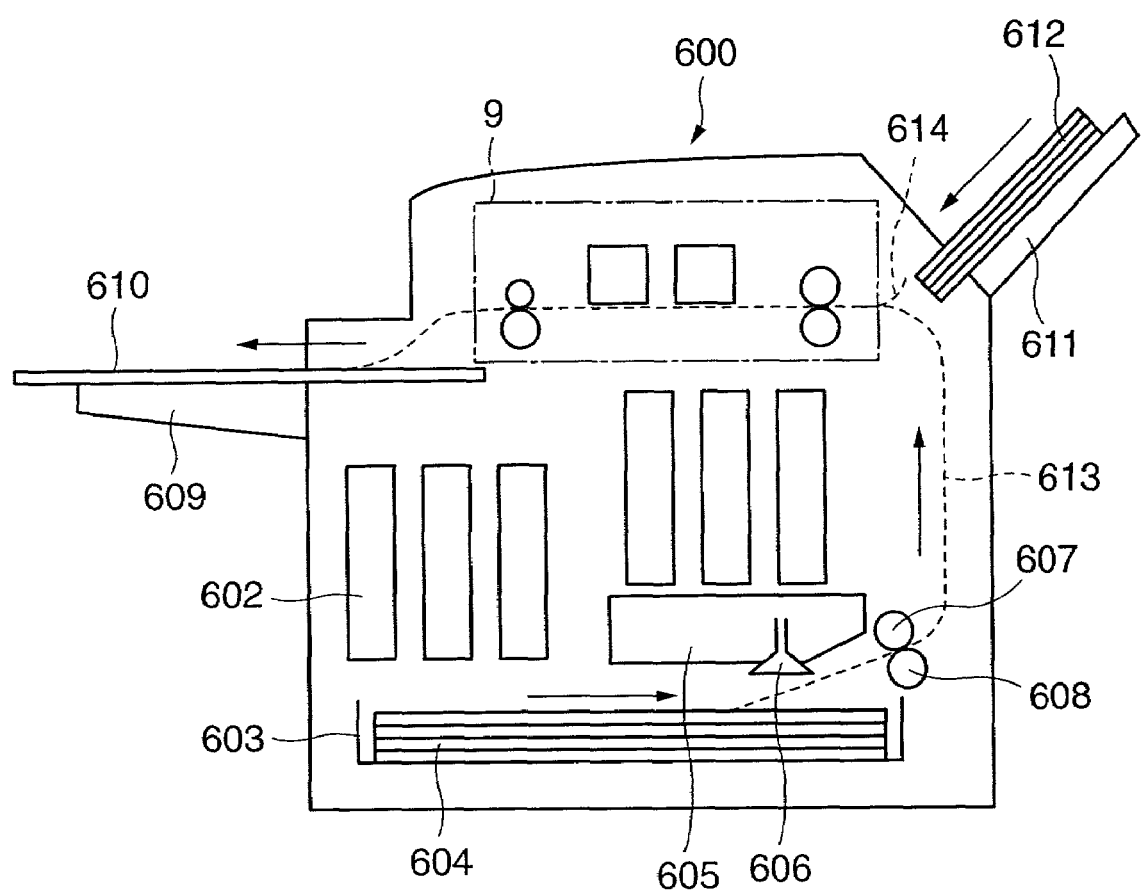
FIG. 8 is a sectional view showing the overall arrangement of an inkjet printer of the third embodiment of the present invention.

FIG. 8 is a sectional view showing the overall arrangement of the inkjet printer. In FIG. 8, reference numeral 600 denotes the whole printer; and 9, a printing unit. The arrangement of this printing unit 9 will be described later. Reference numeral 602 denotes ink tanks each connected to a printhead by a tube (not shown) to supply ink; and 603, a film cassette. In this embodiment, the film cassette 603 contains films 604 as printing media. This cassette 603 can be pulled out from the apparatus, and the cassette 603 is pulled out when films are loaded into it. A separation unit 605 has a function of extracting films one by one from the cassette 603 by operating a sucking disk 606.

A movable partition is set in the cassette 603. By appropriately moving the position of this partition, printing media (films) of various sizes can be loaded. For example, it is possible to load films of 14×17 inches, 14×11 inches, 12×10 inches, and 8×10 inches often used for medical purposes. Although transparent films are mainly used, reflecting films can also be used.

Reference numerals 607 and 608 denote a pair of rollers which clamp and convey a film; 609, a discharge tray on which a printed film 610 is placed; and 611, a paper tray on which printing sheets 612 are stacked. This paper tray 612 has a movable partition similar to that of the cassette 603. By properly moving the position of this partition, printing sheets and films of various sizes can be stacked. For example, A4 and A3 printing sheets and 8×10 films can be stacked. A separating means (not shown) is placed near the paper tray 611 to separate printing sheets or films stacked on the paper tray and supplies these sheets or films one by one to a convey path.

Film or printing sheet sensors are attached to the cassette 603 and the paper tray 611 to sense the size of loaded films or printing sheets. Alternatively, a user may instruct, from an operation unit, the printer to detect the size of loaded films or printing sheets, without using any such sensors. Reference numerals 613 and 614 denote convey paths along which films and printing sheets are conveyed.

<Arrangement of Printing Unit>

Figure 9:
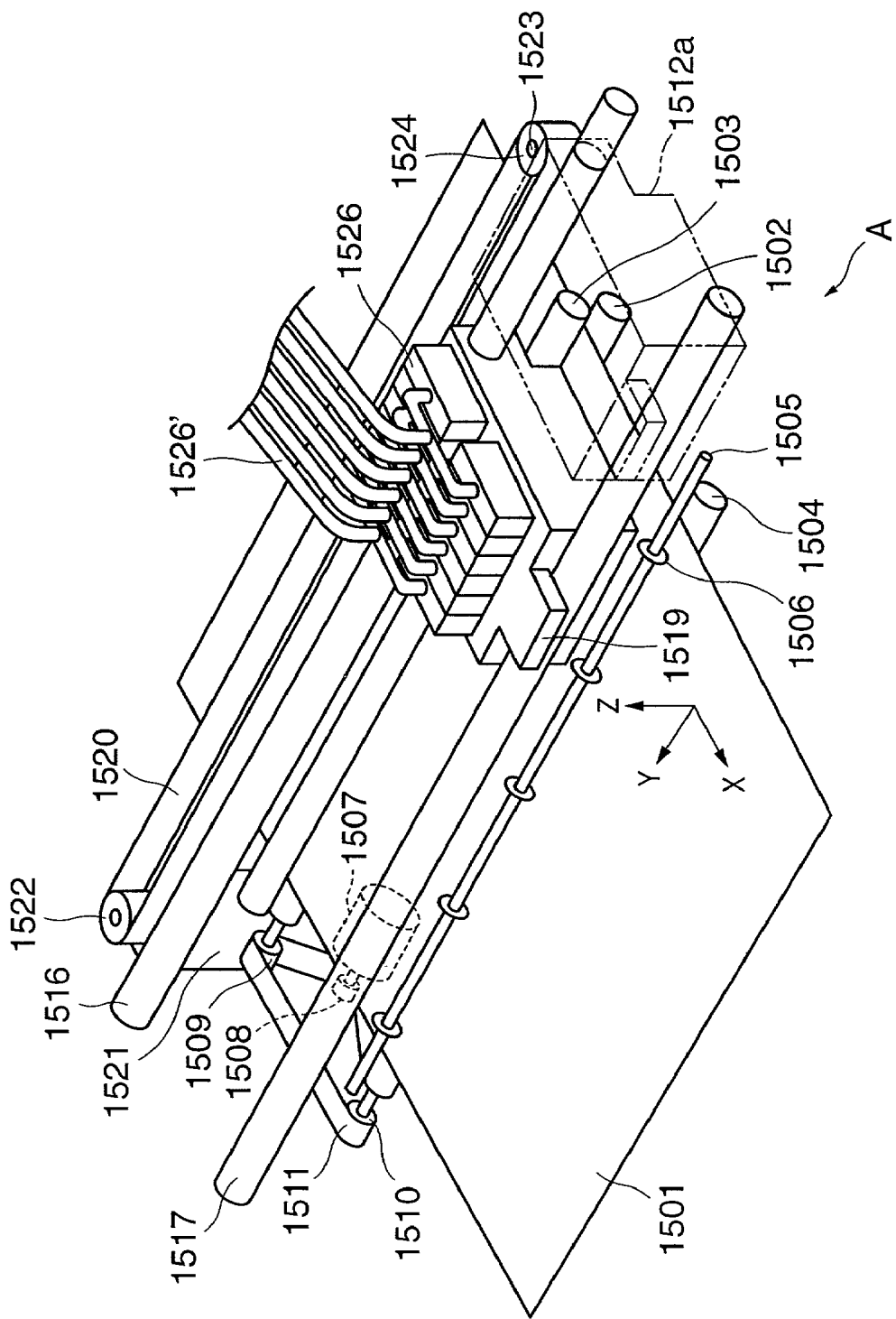
FIG. 9 is a perspective view showing the arrangement of a printing unit of the printer shown in FIG. 8.
Figure 10:
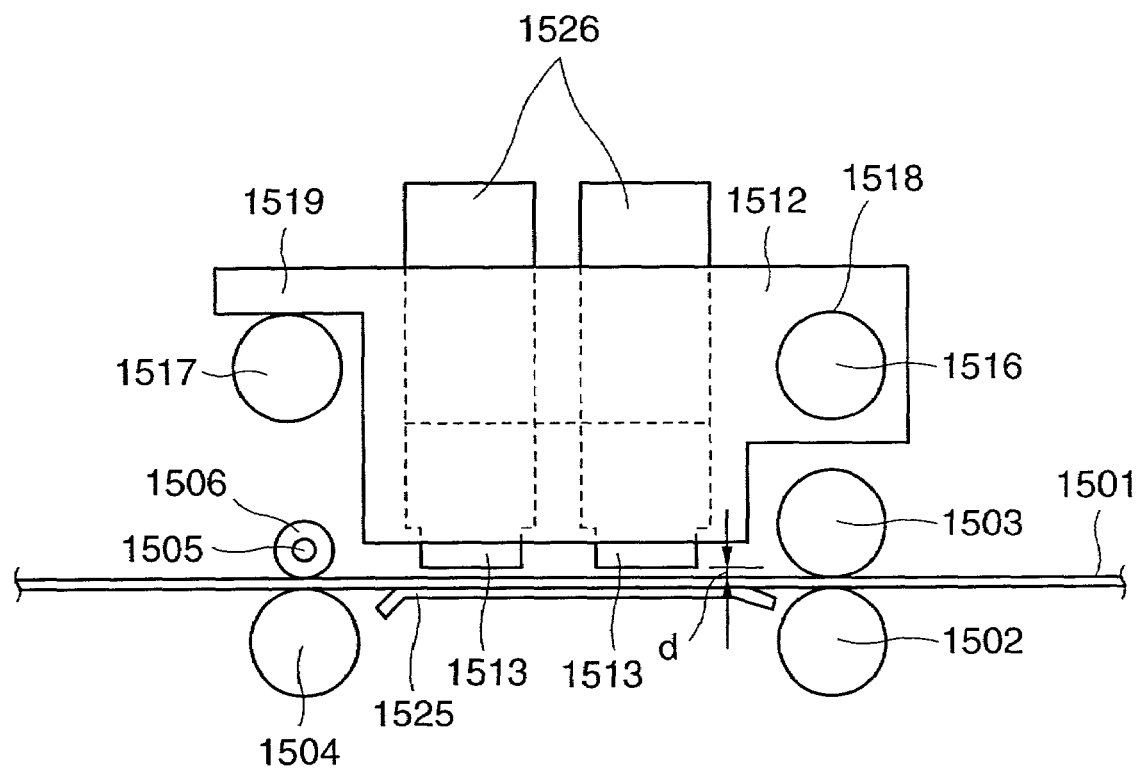
FIG. 10 is a sectional view showing the arrangement of the printing unit of the printer shown in FIG. 8.
Figure 11:
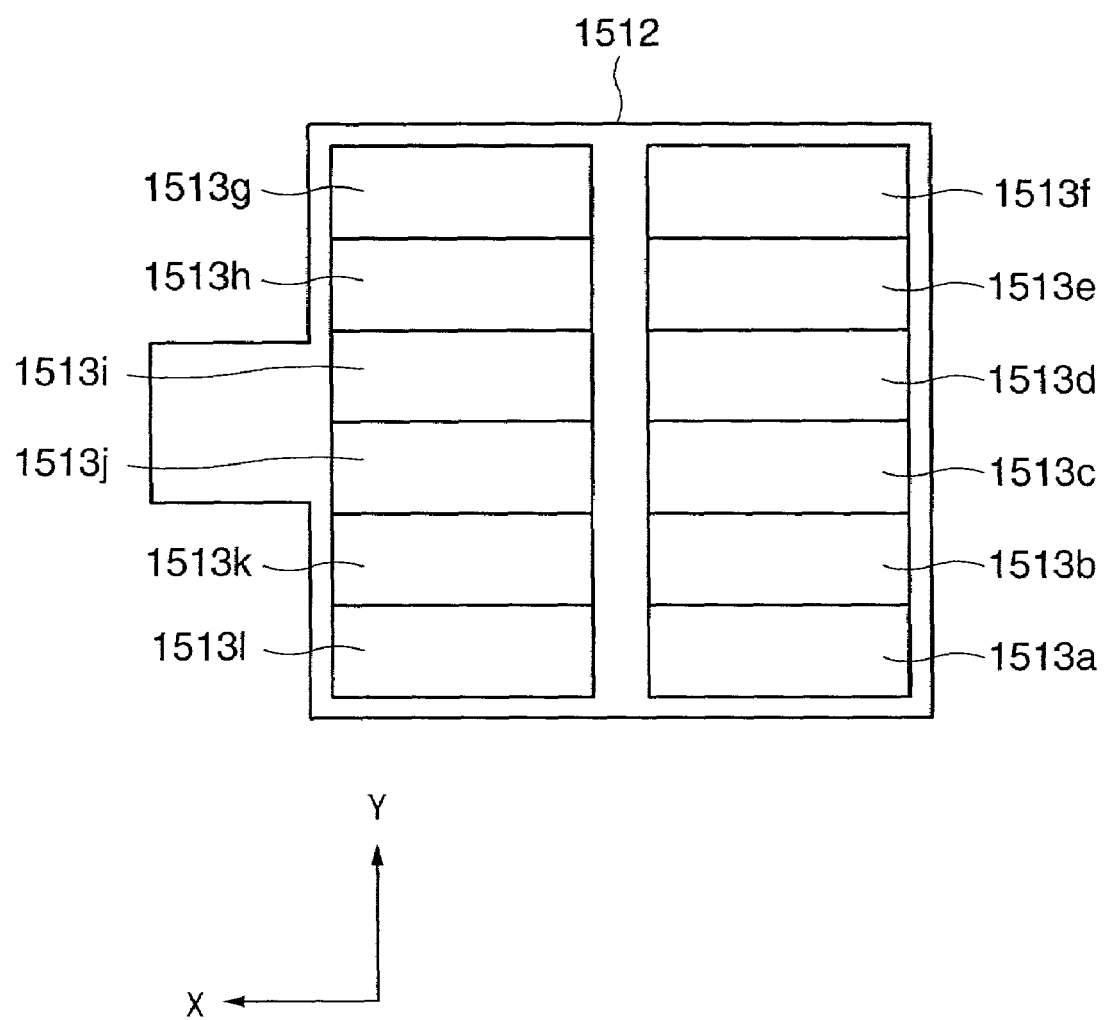
FIG. 11 is a plan view showing the arrangement of a carriage of the printer shown in FIG. 8.
Figure 12A:
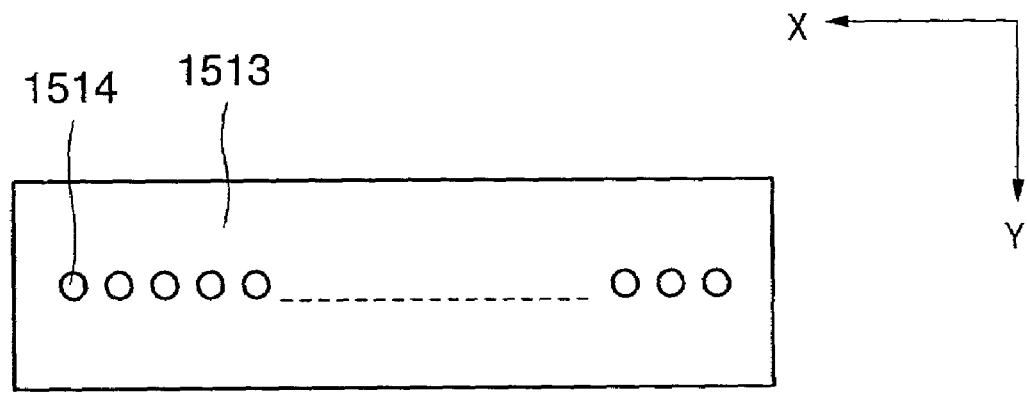
FIGS. 12A and 12B are views showing the nozzle arrangement of a printhead and formed dots, respectively.
Figure 12B:
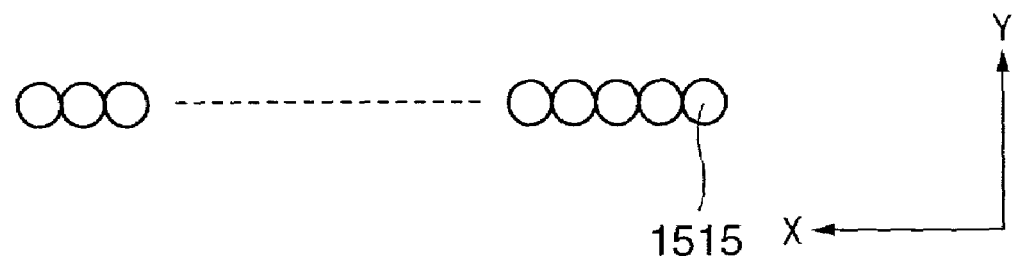
Figure 13:
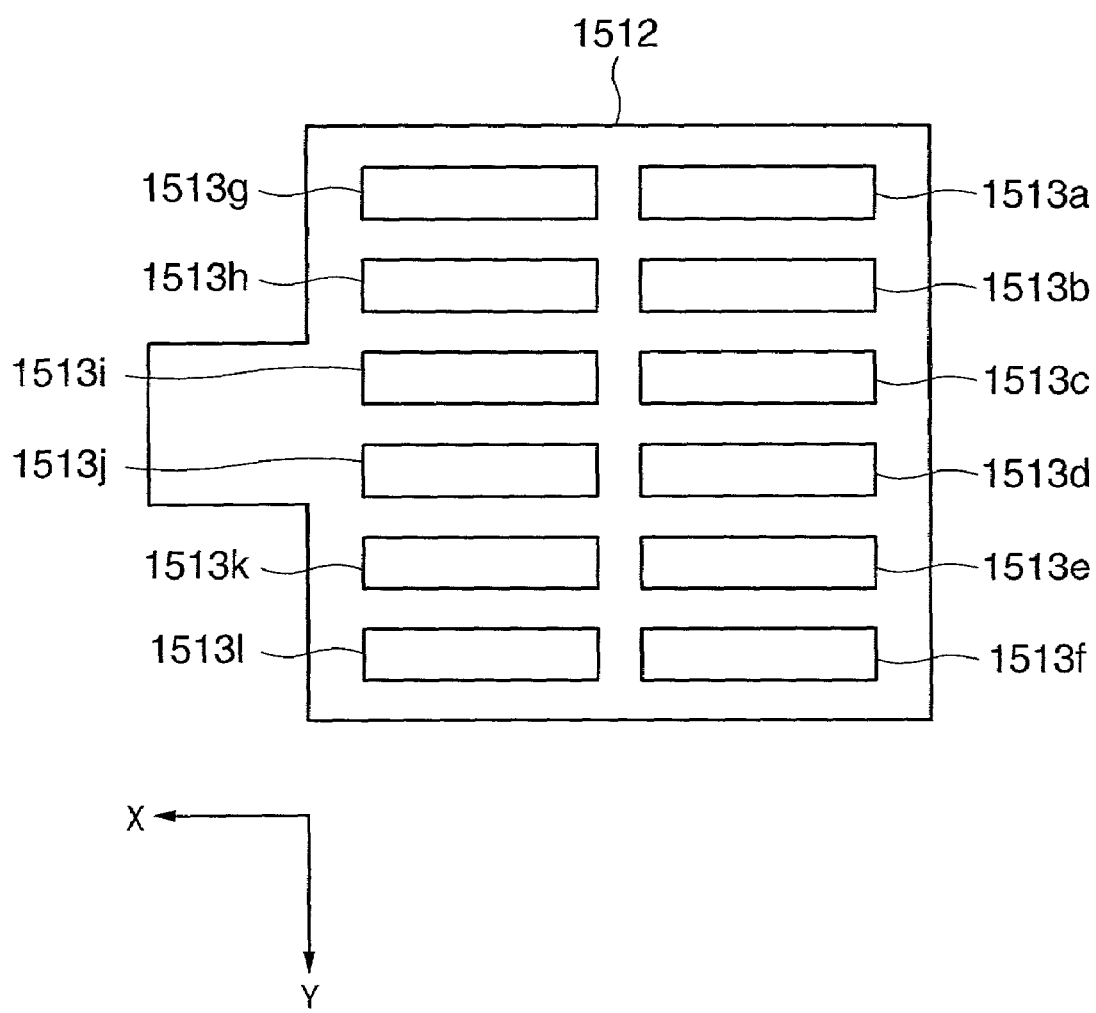
FIG. 13 is a bottom view showing the arrangement of the carriage of the printer shown in FIG. 8.

Details of the arrangement of the printing unit 9 will be described below. FIG. 9 is a perspective view showing the arrangement of the printing unit 9 of the inkjet printer. FIG. 10 is a side view taken along an arrow A in FIG. 9. FIGS. 11 to 13 are partial detailed views in which FIG. 11 is a view showing a carriage from above, FIG. 12A is a view showing a printhead from the lower side of FIG. 9, FIG. 12B is a view showing the state in which ink is printed on a printing medium, and FIG. 13 is a view showing the carriage from below.

In these drawings, reference numeral 1501 denotes a printing medium such as a film or printing sheet on which an image is to be printed; 1502 and 1503, a pair of rollers for conveying a printing medium in an X direction; and 1504 and 1505, another pair of rollers for conveying a printing medium in the X direction. The roller 1505 partially has expanded portions 1506 which are brought into contact with a printing medium.

Reference numeral 1507 denotes a motor; 1508, a pulley attached to the motor shaft; and 1509 and 1510, pulleys attached to the end portions at one side of the rollers 1502 and 1504. These pulleys 1509 and 1510 are coupled with the pulley 1508 by a belt 1511, and the rollers 1502 and 1504 are rotated by the rotation of the motor. Also, the rollers 1503 and 1505 are biased to be pushed against the rollers 1502 and 1504, respectively, by a mechanism (not shown). With the above arrangement, a printing medium is conveyed in the X direction.

Reference numeral 1512 denotes a carriage mounting a plurality of printheads 1513a to 1513l. As shown in FIG. 12A, each printhead has a large number of nozzles opposing a printing medium. Reference numerals 1516 and 1517 denote shafts for slidably holding the carriage. The shaft 1516 extends through a hole 1518 formed in the carriage, and a projection 1519 formed on the carriage mounts the shaft 1517. With the above arrangement, the surface of the printhead 1513 on which nozzles are formed opposes a printing medium by a predetermined distance d.

Reference numeral 1520 denotes a belt partially fixed to the carriage 1512. This belt 1520 connects a pulley 1522 attached to the shaft of a motor 1521 and a pulley 1524 rotatably attached to a fixed shaft 1523. With the above arrangement, the carriage can move in a Y direction and its opposite direction by the rotation of the motor 1521. In this way, the carriage can move over the entire area in the Y direction and can also move to a waiting position 1512a of the carriage and to a symmetric position of the position 1512a with respect to a printing medium. While the carriage is moving over a printing medium, the distance between the nozzle surface and the printing medium is kept at d.

Reserve tanks 1526a to 1526l are attached to the corresponding printheads 1513a to 1513l to supply inks to these printheads. These reserve tanks 1526a to 1526l are connected to tubes 1526' which are connected to ink tanks to replenish the reserve tanks with inks from these ink tanks.

In this embodiment, twelve reserve tanks and twelve printheads are prepared. That is, six types of black inks different in density (#1 to #6 in increasing order of density) are used, and two reserve tanks and two printheads are used for each density.

Reference numeral 1525 denotes a printing medium guide formed between the rollers 1502 and 1504. Reference numeral 1515 in FIG. 12B denotes dots formed by ink droplets discharged from the nozzles onto a printing medium by the above arrangement.

The operation of printing data on a printing medium will be described below with reference to FIG. 10. First, the printing medium 1501 is fed between the rollers 1502 and 1503 from the right-hand side of FIG. 10. This printing medium 1501 is intermittently fed a predetermined distance at a time in the X direction. While the printing medium 1501 is stopped, the motor 1521 rotates to move the carriage in the Y direction at a predetermined speed. While the printheads on the carriage pass over the printing medium, a signal for discharging ink droplets from the nozzles in accordance with an image signal is supplied. In accordance with this signal, ink droplets are selectively discharged from the individual nozzles.

While the printheads are in a position away from the printing medium after passing over the printing medium, the motor 1507 moves the printing medium by a predetermined distance in the X direction, and stops the printing medium. The motor 1507 again moves the printing medium at a predetermined speed, and ink droplets are selectively discharged from the printheads. By repeating this processing, a desired image is finally printed on the printing medium. The completely printed printing medium is conveyed to the left in FIG. 10 by the rollers 1504 and 1506 and discharged by the conveyor means.

<Control Configuration of Printer>

Figure 14:
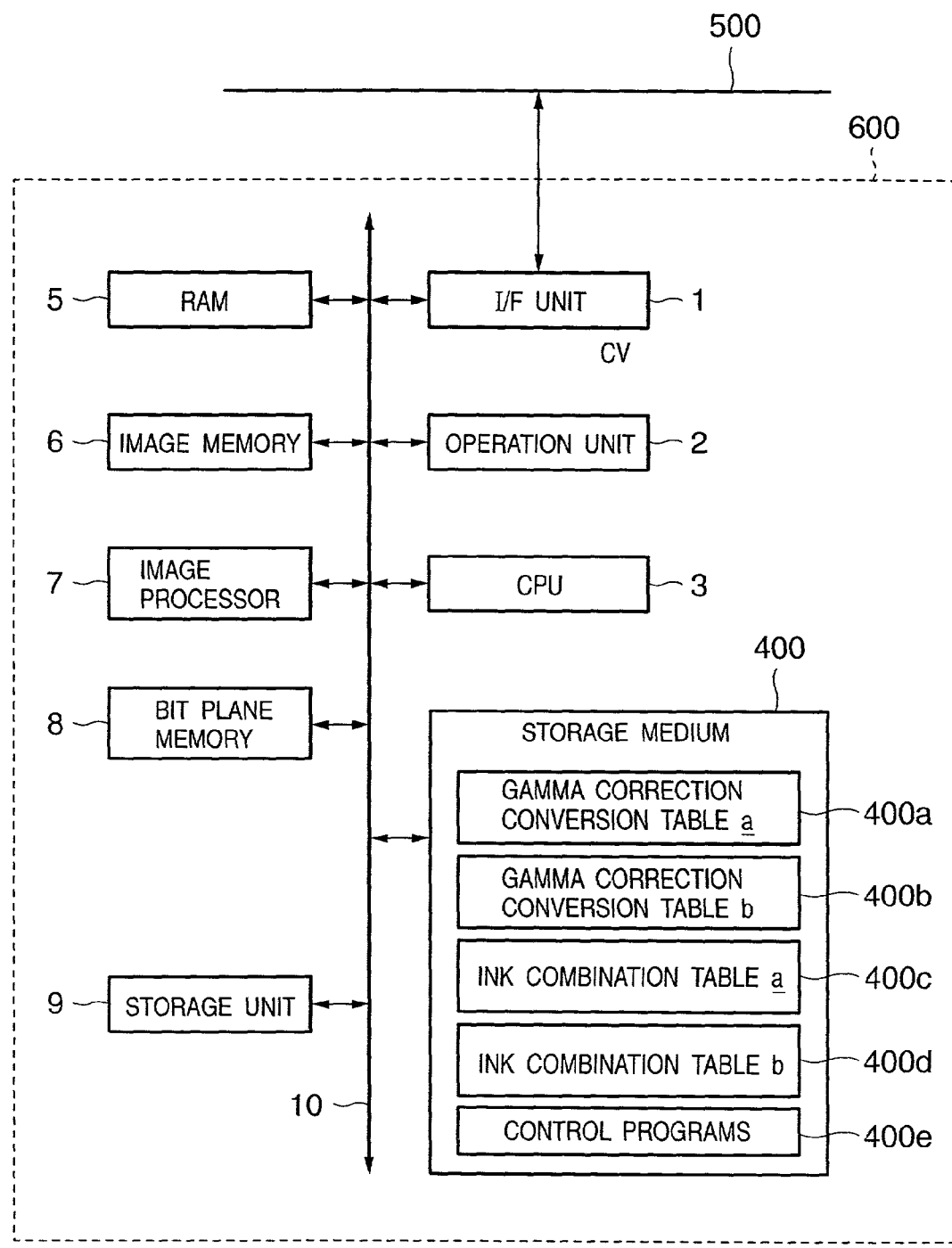
FIG. 14 is a block diagram showing the control configuration of the printer shown in FIG. 8.

FIG. 14 is a block diagram showing the control configuration of the inkjet printer 600 described above. In FIG. 14, reference numeral 500 denotes a communicating means connected to the host; and 1, an I/F unit. Image data to be printed by the printer is input, in the form of density data (CV value) corresponding to each pixel, from the host (not shown) to the I/F unit 1 via the communicating means 500. An operation unit 2 includes various keys by which a user sets diverse parameters and designates the start of printing. A CPU 3 controls the overall printer in accordance with various programs in a storage medium.

A storage medium 400 stores control programs and programs for operating the printer in accordance with an error processing program. The printer 600 always operates in accordance with these programs. As this storage medium 400 storing the programs, it is possible to use, e.g., a ROM, FD, CD-ROM, HD, memory card, or magnetooptical disk.

The storage medium 400 stores two types of gamma correction tables, two types of ink combination tables, and various control programs 400e. The two types of gamma correction tables are a gamma correction table a (400a) and a gamma correction table b (400b) for converting a gamma curve depending on a modality into a desired gamma curve when the data is printed by the printer. The two types of ink combination tables are an ink combination table a (400c) and an ink combination table b (400d).

FIG. 15 is an example of the gamma correction table a. FIG. 16 is an example of the gamma correction table b. The gamma correction table a converts CV values of 0 to 255 into CD values of 0 to 255. The gamma correction table b converts CV values of 0 to 255 into CD values of 0 to 4,095. The gamma correction table b can convert a gamma curve to a desired gamma curve more precisely than the gamma correction table a. Since, however, the number of bits of output data increases, processing after the conversion is time-consuming.

FIG. 17 is an example of the ink combination table a. FIG. 18 is an example of the ink combination table b. In FIGS. 17 and 18, reference symbol No. denotes a gray level; dl, an ink density; and th, a threshold value.

Compared to the ink combination table b, the number of types of inks to be used in the ink combination table a is smaller by one, i.e., the number is five, and the number of rows of this table is also smaller. Therefore, when compared to the ink combination table b, the ink combination table a increases the maximum value of a difference between a CD value corresponding to density data and a CD value when printing is performed by an overlay printing combination determined in the table. However, the number of inks to be overlaid decreases, and this reduces the ink amount used.

Reference numeral 5 denotes a RAM to be used as a work area for diverse programs in the storage medium 5, as a temporary saving area during error processing, and as a work area during image processing; 6, an image memory for storing input images; 7, an image processor for forming a discharge pattern for realizing multiple gray levels by inkjet on the basis of an input image; and 8, a bit plane memory for storing binarized image data.

Reference numeral 9 denotes a printing unit for forming a dot image on the basis of the discharge pattern formed by the image processor; and 10, a bus line for transmitting an address signal, data, control signal, and the like in this apparatus.

<Inks To Be Used>

The characteristics of inks to be used by the printheads will be described below. As shown in Table 1 below, six types of inks are used, and these inks are numbered #1 to #6 in increasing order of density. Table 1 also shows the dye density (%) of each ink and the transmission density (printing OD value) when each ink is printed on a transparent printing medium.

| Type | #1 | #2 | #3 | #4 | #5 | #6 |
|---|---|---|---|---|---|---|
| Dye density | 0.125 | 0.25 | 0.5 | 1 | 2 | 3.88 |
| Transmission density | 0.06 | 0.11 | 0.22 | 0.44 | 0.89 | 1.72 |

Each ink consists of a dye and solvent. The solvent is prepared by adding to water various additives such as a surfactant and humectant. These additives control the discharge characteristic of the printhead and the absorption characteristic on a printing medium.

When these inks are used, the number of gray levels that can be represented by one pixel is $6 + {}_6C_2 + {}_6C_3 + {}_6C_4 + 1 = 57$ under the limitations that the maximum number of times of overlay printing on one pixel is 4 and no ink dots of the same density are overlaid. In Table 1, inks having dye densities by any combinations of which the same density cannot be obtained are set. The density ratio of dots individually formed by four types of low-density inks is 1:2:4:8 from the lowest-density ink dot.

An image is output by using 53 of these 57 gray levels. That is, an image is output by 53-level input image data (256 gray levels). The types and combinations of inks for expressing each gray level (of the 53 gray levels) follow the ink combination table a or b shown in FIG. 17 or 18 described above. In FIGS. 17 and 18, the column of No. indicates the individual gray levels. Symbols * in FIG. 18 indicate combinations not to be used so that a density level difference between low-density portions is smaller than that between high-density portions.

In the columns of #1 to #6, ○ indicates that ink is discharged from the printhead, and X indicates that ink is not discharged from the printhead. The column of dl[i] (i=0 to 52: integer) indicates an ink density level (proportional to a printing CD value) for expressing each corresponding gray level. The column of th[i] (i=0 to 52: integer) indicates a threshold value for determining one of the 53 gray levels for input image data. This threshold value is normally determined as the ink density level at a midpoint between an ink density level dl[k−1] and an ink density level dl[k].

The combination of the types of inks indicating each gray level is ink combination data, and the ink density level determined on the basis of the combination is ink density data.

By using the 53 ink density levels (dl[0] to dl[57]) and the 52 threshold values (th[1] to th[52]), the multilevel error diffusion processor 2 performs a multilevel error diffusion process of 53-level input image data (256 gray levels).

In this embodiment, input image data is converted into multi-level data by using the multilevel error diffusion process. However, the method is not restricted to this process. For example, input image data may also be converted into multi-level data by using another multi-level conversion method, e.g., a multilevel average density saving method, multilevel dither matrix method, or submatrix method.

<Image Processor>

An image processing flow of the printer will be described below with reference to FIG. 19.

The process explained below can be executed by either hardware (an image processing board) or software. When the process is to be executed by software, the image processor 7 as hardware does not exist. That is, an image processing program is stored in control programs, and the process is executed by executing this program under the control of the CPU.

When a user designates printing of a desired image from the operation unit, data load process S100 is performed via the I/F unit 1, and the loaded data is stored in the image memory. In modality check S101, attached information contained in the data is checked to detect a modality that has acquired the image. In table selection S102, if the detected modality is any of CT, MR, and US, the gamma correction table a and the ink combination table a are selected; if the modality is DR, the gamma correction table b and the ink combination table b are selected.

In designated media check S103, the attached information is checked. If the attached information contains medium designation information, the designated medium is selected. If the attached information contains no medium designation information and if the image acquisition modality previously checked is DR, a film is chosen; if the image acquisition modality is any of CT, MR, and US, paper is chosen.

In gamma correction process S11, image data is extracted from the data stored in the image memory, the CV value of each pixel is converted into a signal CD value representing density by using one of the gamma correction conversion tables a and b selected in table selection S102, and this signal CD value is stored in the image memory.

In pre-processing S12, enlarging interpolation, image rotation, formatting, and the like are performed for the image in the image memory. In pixel of interest selection S13, one pixel to be processed is selected from an image memory area, and a density data CD value is obtained. In ink distribution process S14, data of the combination of inks to be overlaid is obtained by looking up the ink combination table a or b selected in table selection S102, thereby determining a binary signal indicating discharge or non-discharge of ink of each density. In addition, from these determined binary signals, binary signals indicating discharge or non-discharge of corresponding printheads are determined in accordance with predetermined rules, and recorded in the bit plane memories 8 corresponding to these printheads.

In error diffusion process S16, a difference between a CD value corresponding to the density data and a CD value when printing is performed by the overlay printing combination determined as above is distributed to surrounding pixels not completely expanded, thereby increasing or decreasing the CD value of the corresponding pixel in the image memory.

<Error Diffusion Process>

Details of error diffusion process S16 will be described below with reference to FIGS. 20A and 20B.

Figures 20A, 20B:
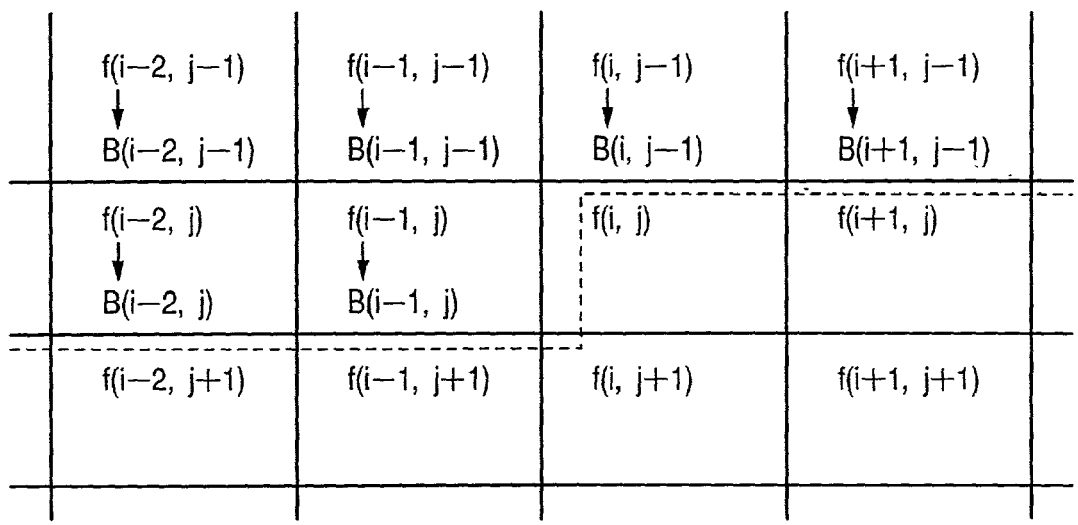
FIGS. 20A and 20B are views for explaining an error diffusion process.

FIG. 20A is a schematic view showing the arrangement of input image data and 53-level image data obtained after the multilevel error diffusion process. That is, FIG. 20A shows a portion of the arrangement of pixels in 256-level density data (0[black] to 255[transparent]) of each pixel indicated by input image data. Referring to FIG. 20A, f(i,j) indicates the 256-level density data level of a pixel (i,j) of interest to be converted into multilevel data (53-level). Pixels f(i−2,j−1) to (i−1,j) above the broken line are already converted into multilevel data (53-level). B(i,j) indicates density data (53 levels of "0", "8.6", . . . , "250.7", and "255") after the pixel (i,j) of interest is converted into multilevel data (53-level). After the pixel (i,j) of interest is converted into multilevel data (53-level), f(i,j+1), f(i,j+2), . . . , are similarly converted into multilevel data (53-level).

First, the 256-level density data level f(i,j) of the pixel (i,j) of interest is compared with the threshold value th[k].

$$th[k] \leq f(i,j) < th[k+1] \quad (1)$$

$$B(i,j) = dl[k] \quad (2)$$

k which satisfies inequality (1) above is calculated, and density data B(i,j) after the pixel (i,j) is converted into multilevel data (53-level) is determined by equation (2).

Subsequently, an error diffusion matrix shown in FIG. 20B is used to calculate an error err produced between the density data B(i,j) determined by the above multi-level process and the 256-level density data level f(i,j) before the multi-level process, by using $$err = f(i,j) - dl[k] \quad (3)$$

The calculated error err is diffused to other pixels in accordance with $$f(x,y) = f(x,y) + err \times M(x-i, y-j)/31 \quad (4)$$

In this manner, the error err is diffused to each pixel in accordance with the distribution of the error diffusion matrix as shown in FIG. 20B. After that, the multi-level (53-level) process is similarly performed by using the value f'(i,j) including this diffused error.

By the above processing, the pixel of interest is completely processed.

Figure 19:
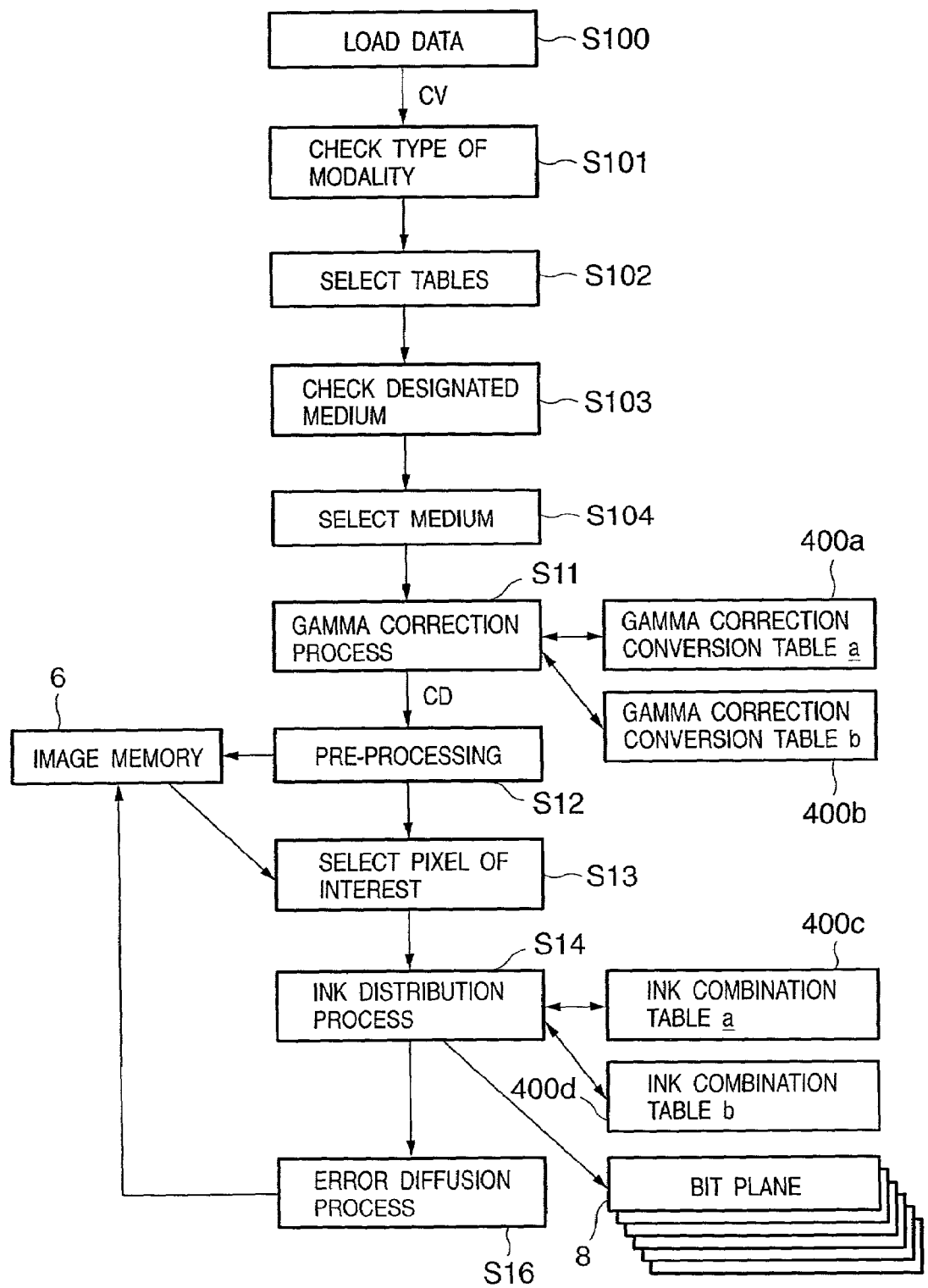
FIG. 19 is a flow chart of image processing of the third embodiment.

On the basis of the density data CD value of the image, the processes in steps S14 and S16 of FIG. 19 are repeatedly executed for all pixels in a certain area. Consequently, binary signals d1, d2, d3, . . . , indicating discharge or non-discharge for each pixel are formed for the individual printheads.

The above-mentioned area may be the whole area of one page to be printed, and the process of printing may be started after a bit plane of one page is completed. It may also be possible to divide one page into several areas and complete a bit plane for each divided area. In this case, after the first area is printed, the next area is processed. In the latter case, each individual bit plane may be further divided into a plurality of bit planes such that a bit plane of a certain area is formed while a printing process of the preceding area is being executed.

In this embodiment as described above, when data is transferred to the printer an appropriate gamma correction table and ink combination table are selected from the image acquisition modality of attached information contained in the data, thereby generating and printing a printing signal.

Accordingly, a user need only perform the output process without performing any parameter setting process for the printer. This reduces operations by the user until data is finally output, so an appropriate image corresponding to the data can be obtained without any expert knowledge.

[Fourth Embodiment]

The fourth embodiment of the present invention will be described below. Note that a description of parts similar to those of the above third embodiment will be omitted.

Figure 21:
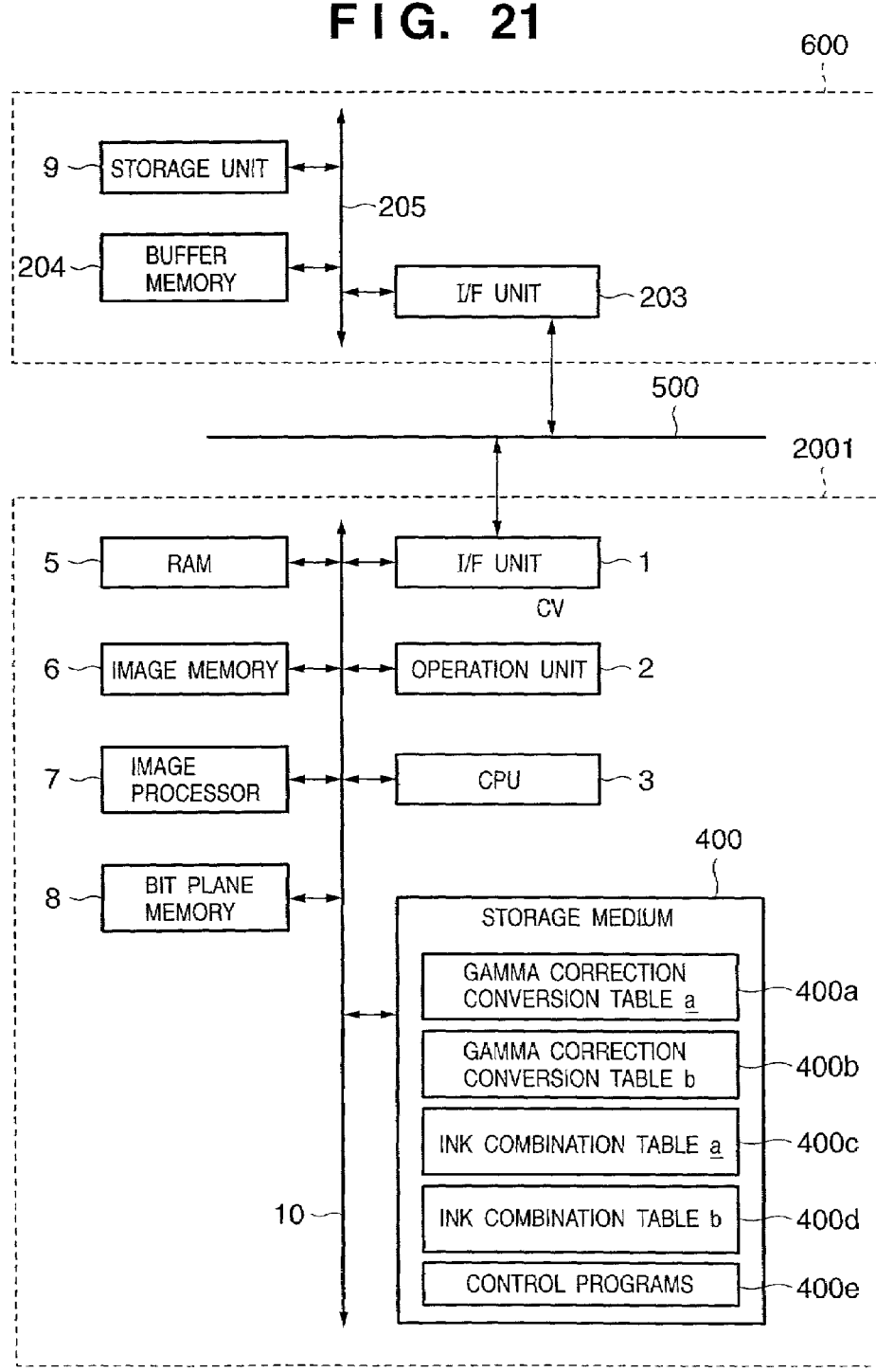
FIG. 21 is a block diagram showing the system configuration of the fourth embodiment.

FIG. 21 is a block diagram showing the arrangement of this embodiment. Similar to the third embodiment, this embodiment includes a host 2001 and a printer 2002 which are connected by a communicating means 500. However, the components included in the printer in the third embodiment are included in the host 2001 except for a printing unit 9.

Except for this printing unit 9, the host computer 2001 includes the same components as the inkjet printer 600 shown in FIG. 14. The printer 2002 has an I/F unit 203 connected to the communicating means. This I/F unit 203, a buffer memory 204, and the printing unit 9 are connected to a bus line 205.

When printing is performed in this embodiment, the processing is basically performed in accordance with the flow shown in FIG. 19. More specifically, the same flow as in FIG. 19 is carried out in the host computer 2001 until data is bitmapped into bit planes in step S8. The data thus bitmapped into bit planes is input to the printer 2002 via an I/F unit 1, the communicating means 500, and the I/F unit 203, and temporarily stored in the buffer memory 204. After that, the data is sequentially extracted from the buffer memory 204 and printed in the same manner as in the above third embodiment.

In this embodiment as described above, when data is transferred to the printer as an output process, an appropriate gamma correction table and ink combination table are selected by the host from the image acquisition modality of attached information contained in the data. These tables are transmitted to the printer together with data necessary for printing, thereby performing printing.

Accordingly, a user need only perform the output process without performing any parameter setting process for the printer. This reduces operations by the user until data is finally output, so an appropriate image corresponding to the data can be obtained without any expert knowledge.

[Other Embodiment]

The third and fourth embodiments described above uses the image acquisition modality name of attached information transmitted together with image data. However, another attached information can also be used. Examples of the attached information are the examination requesting department name (examination requesting department ID), the examination requesting person name (examination requesting person ID), the examination name (examination ID), the examination reason name (examination reason ID), the attributes of a patient (e.g., inpatient or outpatient, his or her past history, and new patient or not) (patient ID), the purposes of use of a hard copy (e.g., for diagnosis, for the examination requesting party, for explanation for the patient, for education, and for materials to be announced), and the type and size of film to be used in printing.

In the above embodiments, droplets discharged from the printhead are ink droplets, and a liquid stored in the ink tank is ink. However, the liquid to be stored in the ink tank is not limited to ink. For example, a treatment solution to be discharged onto a printing medium so as to improve the fixing property or water resistance of a printed image or its image quality may be stored in the ink tank.

Each of the embodiments described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of so-called an on-demand type and a continuous type. Particularly, in the case of the on-demand type, the system is effective because, by applying at least one driving signal, which corresponds to printing information and gives a rapid temperature rise exceeding nucleate boiling, to each of electrothermal transducers arranged in correspondence with a sheet or liquid channels holding a liquid (ink), heat energy is generated by the electrothermal transducer to effect film boiling on the heat acting surface of the printing head, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printing head, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printing head having a length corresponding to the width of a maximum printing medium which can be printed by the printer, either the arrangement which satisfies the full-line length by combining a plurality of printing heads as disclosed in the above specification or the arrangement as a single printing head obtained by forming printing heads integrally can be used.

In addition, not only an exchangeable chip type printing head, as described in the above embodiment, which can be electrically connected to the apparatus main unit and can receive an ink from the apparatus main unit upon being mounted on the apparatus main unit but also a cartridge type printing head in which an ink tank is integrally arranged on the printing head itself can be applicable to the present invention.

It is preferable to add recovery means for the printing head, preliminary auxiliary means, and the like provided as an arrangement of the printer of the present invention since the printing operation can be further stabilized. Examples of such means include, for the printing head, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printing head or by combining a plurality of printing heads.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention.

In the present invention, the above-mentioned film boiling system is most effective for the above-mentioned inks.

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program code for performing the aforesaid processes to a computer system or apparatus (e.g., a personal computer), reading the program code, by a CPU or MPU of the computer system or apparatus, from the storage medium, then executing the program. In this case, the program code read from the storage medium realize the functions according to the embodiments, and the storage medium storing the program code constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides aforesaid functions according to the above embodiments are realized by executing the program code which are read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium are written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

If the present invention is realized as a storage medium, program codes corresponding to the above mentioned flowchart (FIG. 3, FIG. 4, FIG. 7, FIG. 19) is to be stored in the storage medium.

As many apparently widely different embodiments of the present invention can be made without departing from the spirit and scope thereof, it is to be understood that the invention is not limited to the specific embodiments thereof except as defined in the claims.

What is claimed is:

1. A method of setting output conditions of an output apparatus capable of setting a plurality of output parameters, comprising:
   the detection step of, when data to be output in accordance with a predetermined protocol and attached information of the data are input, detecting the attached information;
   the selection step of selecting an output parameter in accordance with the attached information detected in the detection step; and
   the conversion step of converting the data in accordance with the selected output parameter,
   wherein in said detection step, information on a type of a data generation apparatus which generated the data is detected, as the attached information, and
   wherein in said selection step, the output parameter having different number of printing gray levels is selected in accordance with the information on the type of data generation apparatus.

2. The method according to claim 1, wherein the detection step, selection step, and conversion step are executed in the output apparatus.

3. The method according to claim 1, wherein the detection step, selection step, and conversion step are executed in a host apparatus which transmits the data and attached information to the output apparatus.

4. The method according to claim 1, wherein the predetermined protocol is a medical image communication protocol.

5. The method according to claim 1, wherein the output apparatus is a printing apparatus for printing data on a printing medium.

6. The method according to claim 5, wherein the output apparatus is an inkjet printing apparatus for printing data on a printing medium by discharging ink droplets.

7. The method according to claim 5, wherein the output parameter includes a gamma characteristic and in said selecting step, the output parameter having different gamma characteristic and different number of printing gray levels is selected in accordance with the information on the type of the data generation apparatus.

8. An output system including a host apparatus for outputting data to be output in accordance with a predetermined protocol and attached information of the data, and an output apparatus capable of setting a plurality of output parameters, comprising:
   detecting means for detecting information on a type of a data generation apparatus which generated the output data from the host apparatus, as the attached information;
   selecting means for selecting an output parameter in accordance with the detected attached information; and
   converting means for converting the data in accordance with the selected output parameter,
   wherein said selecting means selects the output parameter having different number of the printing gray levels in accordance withe the information on the type of the data generation apparatus.

9. The system according to claim 8, wherein said output apparatus comprises said detecting means, selecting means, and converting means.

10. The system according to claim 8, wherein said host apparatus comprises said detecting means, selecting means, and converting means.

11. The system according to claim 8, wherein the predetermined protocol is a medical image communication protocol.

12. The system according to claim 8, wherein said output apparatus is a printing apparatus for printing data on a printing medium.

13. A printing apparatus capable of setting a plurality of printing parameters, comprising:
   detecting means for, when data to be output in accordance with a predetermined protocol and attached information of the data are input, detecting the attached information;
   selecting means for selecting a printing parameter in accordance with the detected attached information; and
   converting means for converting the data in accordance with the selected printing parameter,
   wherein said detecting means detects information on a type of a data generation apparatus which generated the data, as the attached information, and
   wherein said selecting means selects the printing parameter having different number of printing gray levels in accordance with the information on the type of data generation apparatus.

14. The apparatus according to claim 13, wherein the predetermined protocol is a medical image communication protocol.

15. The apparatus according to claim 13, wherein said printing apparatus is an inkjet printing apparatus for printing data on a printing medium by discharging ink droplets.

16. The apparatus according to claim 13, wherein the printing parameter includes a gamma characteristic and said selecting means selects the output parameter having different gamma characteristic and different number of printing gray levels in accordance with the information on the type of the data generation apparatus.

17. A program product stored on a computer-readable medium for realizing a method of setting output conditions of an output apparatus capable of setting a plurality of output parameters, comprising codes for realizing:
   the detection step of, when data to be output in accordance with a predetermined protocol and attached information of the data are input, detecting the attached information;
   the selection step of selecting an output parameter in accordance with the attached information; and
   the conversion step of converting the data in accordance with the selected output parameter, wherein in said detection step, information on a type of a data generation apparatus which generated the data is detected, as the attached information, and wherein in said selection step, the output parameter having different number of printing gray levels is selected in accordance with the information on the type of data generation apparatus.

18. A computer-readable storage medium storing a program for realizing a method of setting output conditions of an output apparatus capable of setting a plurality of output parameters, storing codes for realizing:

the detection step of, when data to be output in accordance with a predetermined protocol and attached information of the data are input, detecting the attached information;

the selection step of selecting an output parameter in accordance with the attached information; and the conversion step of converting the data in accordance with the selected output parameter, wherein in said detection step, information on a type of a data generation apparatus which generated the data is detected, as the attached information, and wherein in said selection step, the output parameter having different number of printing gray levels is selected in accordance with the information on the type of data generation apparatus.

19. A method of setting output conditions of an output apparatus capable of setting a plurality of output parameters, comprising:

the detection step of, when data to be output in accordance with a predetermined protocol and attached information of the data are input, detecting the attached information;

the selection step of selecting an output parameter and a type of printing medium in accordance with the attached information detected in the detection step; and the conversion step of converting the data in accordance with the selected output parameter, wherein in said detection step, information on a type of a data generation apparatus which generated the data is detected, as the attached information, and wherein in said selection step, a different output parameter and a different type of printing medium are selected in accordance with the information on the type of data generation apparatus.

20. A printing apparatus capable of setting a plurality of printing parameters, comprising:

detecting means for, when data to be output in accordance with a predetermined protocol and attached information of the data are input, detecting the attached information;

selecting means for selecting a printing parameter and a type of printing medium in accordance with the detected attached information; and converting means for converting the data in accordance with the selected printing parameter, wherein said detecting means detects information on a type of a data generation apparatus which generated the data, as the attached information, and wherein said selecting means selects a different printing parameter and a different type of printing medium in accordance with the information on the type of data generation apparatus.

* * * * *

UNITED STATES PATENT AND TRADEMARK OFFICE
CERTIFICATE OF CORRECTION

PATENT NO. : 7,206,081 B2
APPLICATION NO. : 09/897946
DATED : April 17, 2007
INVENTOR(S) : Sada et al.

Page 1 of 1

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by (1123) days Delete the phrase "by 1123 days" and insert -- by 1243 days--

Signed and Sealed this

Ninth Day of October, 2007

JON W. DUDAS
*Director of the United States Patent and Trademark Office*